US009253647B2

(12) United States Patent
Bontu et al.

(10) Patent No.: US 9,253,647 B2
(45) Date of Patent: Feb. 2, 2016

(54) MOBILE DEVICE FOR A SMART RELAY NETWORK

(75) Inventors: Chandra Sekhar Bontu, Nepean (CA); David G. Steer, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 312 days.

(21) Appl. No.: 13/559,436

(22) Filed: Jul. 26, 2012

(65) Prior Publication Data

US 2013/0029589 A1    Jan. 31, 2013

(30) Foreign Application Priority Data

Jul. 26, 2011   (WO) ................ PCT/CA2011/050458

(51) Int. Cl.
| H04W 16/14 | (2009.01) |
| H04W 48/20 | (2009.01) |
| H04B 7/155 | (2006.01) |
| H04W 84/04 | (2009.01) |

(52) U.S. Cl.
CPC .............. *H04W 16/14* (2013.01); *H04W 48/20* (2013.01); *H04B 7/15592* (2013.01); *H04W 84/047* (2013.01)

(58) Field of Classification Search
CPC .. H04B 7/15592; H04W 16/14; H04W 48/20; H04W 84/047
USPC ........................ 455/7–11.1, 14–25; 370/315
See application file for complete search history.

(56) References Cited

U.S. PATENT DOCUMENTS

| 8,437,286 B2 * | 5/2013 | Cai et al. ........................ 370/315 |
| 2007/0132846 A1 | 6/2007 | Broad et al. |
| 2008/0002608 A1 * | 1/2008 | Zheng et al. ................... 370/328 |
| 2008/0176575 A1 * | 7/2008 | Sutton ............................ 455/450 |
| 2009/0207778 A1 * | 8/2009 | Wang et al. .................... 370/315 |
| 2009/0209265 A1 | 8/2009 | Kwon et al. |
| 2009/0258639 A1 * | 10/2009 | Nystrom ............. H04W 76/025 455/422.1 |

(Continued)

FOREIGN PATENT DOCUMENTS

| CN | 102056305 | 5/2011 |
| WO | WO2010/113261 | 10/2010 |
| WO | WO2011/069096 | 6/2011 |

OTHER PUBLICATIONS

International Search Report & Written Opinion, Patent Cooperation Treaty, PCT application No. PCT/CA2011/050458, mailed Apr. 5, 2012; 8 pages.
International Search Report & Written Opinion, Patent Cooperation Treaty, PCT application No. PCT/CA2011/050459, mailed Apr. 24, 2012; 7 pages.

(Continued)

*Primary Examiner* — Raymond Dean
(74) *Attorney, Agent, or Firm* — Fish & Richardson P.C.

(57) ABSTRACT

A wireless relay node network includes a plurality of relay devices wherein each relay device is configured to receive a first wireless signal in a first frequency band, and transmit a second wireless signal derived from the first wireless signal using a first set of network use parameters. The plurality of relay devices includes at least a first relay device and a second relay device. The first relay device is configured to select the first set of network use parameters from network resources available for communicating over the wireless relay node network based, at least in part, on a control signal received from the second relay device. The second control signal identifies a second set of network use parameters used by the second relay device.

21 Claims, 17 Drawing Sheets

(56) References Cited

U.S. PATENT DOCUMENTS

| | | | |
|---|---|---|---|
| 2009/0316567 A1* | 12/2009 | Larsson | 370/201 |
| 2010/0197223 A1* | 8/2010 | Saito et al. | 455/23 |
| 2011/0090839 A1 | 4/2011 | Hamalainen et al. | |
| 2011/0158156 A1* | 6/2011 | Ma et al. | 370/315 |
| 2011/0164536 A1* | 7/2011 | Lin et al. | 370/259 |
| 2011/0280127 A1* | 11/2011 | Raaf et al. | 370/230 |
| 2012/0008546 A1 | 1/2012 | Yokoyama et al. | |

OTHER PUBLICATIONS

Office Action issued in U.S. Appl. No. 13/559,252 on Nov. 4, 2013; 13 pages.

Office Action issued in U.S. Appl. No. 13/559,252 on May 21, 2014; 15 pages.

International Preliminary Report on Patentability under Chapter I issued in International Application No. PCT/CA2011/050458 on Feb. 6, 2014; 6 pages.

* cited by examiner

MOBILE DEVICE FOR A SMART RELAY NETWORK

CROSS-REFERENCE TO RELATED APPLICATION

The application claims priority to PCT Application No. PCT/CA2011/050458 filed on Jul. 26, 2011, the contents of which are incorporated herein by reference.

TECHNICAL FIELD

The application relates to wireless networks.

BACKGROUND

In cellular communication, certain regions within a coverage area of a wireless cellular network can experience degraded signal quality. In one example, an interior of a building can experience degraded signal quality due to additional penetration losses or scattering. In such cases, a quality of service (QoS) at a user equipment (UE) operating within such a region can be compromised. For example, the UE can experience interruption of service due to problems such as unsuccessful handoffs, communications interruption or call drops. In such cases, relay nodes or relay node networks (e.g. femto cell networks) can be used to extend or improve coverage of the corresponding external wireless cellular network. Such a relay node, however can only communicate with a particular wireless cellular network and a serving cell of the wireless cellular network is aware of the presence of the relay node network. Therefore, separate relay node networks are needed to service UEs communicating with different external wireless networks.

DETAILED DESCRIPTION

The methods and systems described herein can be implemented in many ways. Some useful implementations are described below. The scope of the present application is not limited to the detailed implementations described in this section, but is described in broader terms in the claims.

The present application describes a relay node network that can be used to improve coverage of various external wireless networks in areas where such coverage is otherwise poor. For example, such a relay node network can be deployed to improve coverage within a building where the coverage of external wireless networks is weak. A same relay node network can be used to support more than one external wireless networks operating in accordance with different radio access technologies (RAT). The individual relay nodes of the relay network can be configured to monitor for unused or underused frequency bands and use such bands to communicate with UEs as well as other relay nodes. The individual relay nodes can also be configured to communicate with one another to cooperatively determine allocation of available radio resources such that a particular UE can be served efficiently and without introducing unacceptable interference for other UEs and relay nodes. The individual relay nodes can also be configured to communicate with one another to cooperatively determine allocation of available radio resources without introducing unacceptable interference to external cellular networks. Radio resources can include, for example, available frequency bands, allowed transmission powers (e.g. minimum or maximum transmission powers), or a number of available relay nodes. Radio resources can also be referred to as network use parameters.

Figure 1:
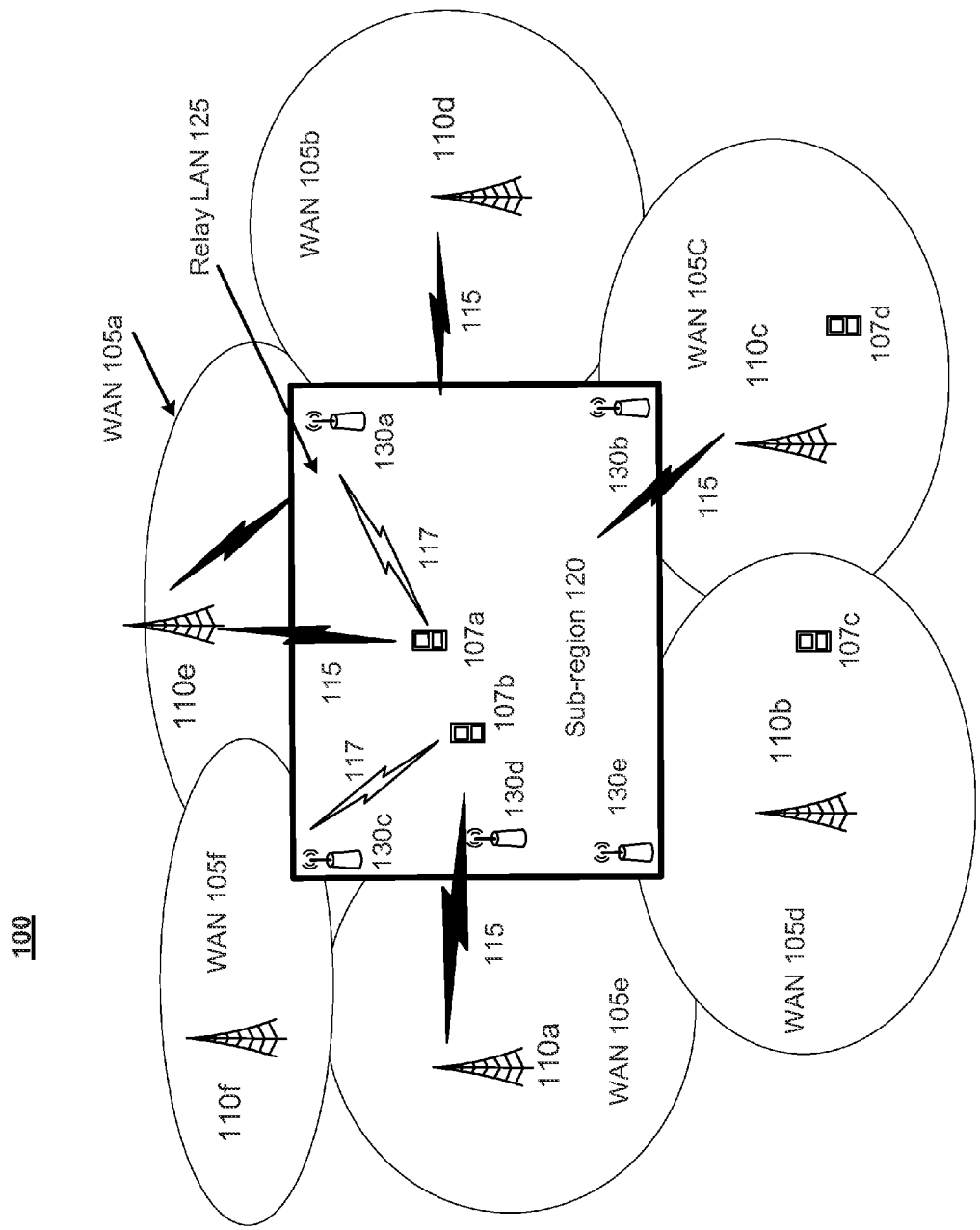
FIG. 1 is a block diagram showing an example of a wireless network environment.

A wireless communication environment can include various wireless networks operating over a same geographic region. FIG. 1 shows a block diagram of an example of such an environment 100 where various external wireless networks 105a-105f (105 in general) are deployed over a same region. The external wireless networks can also be referred to as cellular networks or wide area networks (WAN). In general, a WAN, as used in this document, refers to a cellular network that serves a plurality of UEs 107a-107d (107, in general) such as mobile phones, two-way radios, and pagers. The coverage region of a WAN 105 can be distributed over sub-regions referred to as cells. Each cell of a WAN is typically served by at least one fixed-location transceiver known as a cell site or base station (110a-110f, 110 in general). A base station 110 typically includes an elevated structure (e.g. a tower or a high building) for mounting antennas, one or more sets of transceivers and associated circuitry such as digital signal processors, control electronics, GPS receivers, and power sources. The base station 110 can be referred to by different names based on the cellular technology used. For example, in Global System for Mobile Communication (GSM) networks, the base station 110 can be referred to as a base transceiver Station (BTS). For Universal Mobile Telecommunications System (UMTS) networks the base station 110 can be referred to as a Node B (NB or evolved node B (eNB) in 3GPP Long Term Evolution). In general, various cells of a WAN cellular system together provide coverage over a large geographic area. This enables a large number of UEs 107 to communicate with each other and with fixed transceivers, data communications services and telephones, via the base stations, even when the UEs move between more than one cell of the WAN during such communications.

In some implementations, a particular region may be within the coverage area of a plurality of base stations 110. The various base stations can be parts of a same WAN or different WANs. For example, a base station 110a serving a particular area can be a part of a GSM network while a second base station 110b serving the same area can be a part of a UMTS network. The same area can also be served by a third base station 110c that is a part of a 3GPP Long Term Evolution (LTE) network.

The different base stations 110 can operate in accordance with various RATs or air interface technologies. For example, a base station can use Wideband Code Division Multiple Access (WCDMA) or Time Division Synchronous Code Division Multiple Access (TD-SCDMA) technologies while a BTS type base station uses GSM or Code Division Multiple Access (CDMA) technologies. In some implementations, a single base station 110 can also be configured to support multiple RATs. Other examples of RATs that can be used by the different base stations can include LTE, LTE Advanced (LTE-A), WiMax, and WiFi. The RATs can operate in various multiplexing modes including Time Division Multiplexing (TDM), Frequency Division Multiplexing (FDM), Code Division Multiple Access (CDMA), Orthogonal Frequency Division Multiple Access (OFDMA) and various duplexing modes including Time Division Duplexing (TDD) and Frequency Division Duplexing (FDD).

In some implementations, a sub-region 120 within the coverage of one or more base stations 110 can have degraded signal reception. In such cases, the strength of wireless signals 115 from the one or more base stations 110 at the sub-region 120 is below an acceptable level. In some cases, wireless signals 115 from the base stations 110 may be completely undetectable in the sub-region 120. In some implementations, the sub-region 120 can be an interior of a building where signals from the base stations experience significantly high penetration or path losses. In some implementations, the sub-region 120 can be in a "shadow" area of coverage where the signals to and from a base station do not reach or are at unacceptable levels. In some cases, the sub-region 120 can be within a range of a jamming source that degrades or corrupts signals in a particular frequency range. In general, a UE 107 in the sub-region 120 can experience an unacceptable quality of service (QoS) when communicating directly with a base station 110.

In some implementations, coverage in the sub-region 120 can be improved by using a local area network (LAN) 125 of relay nodes 130 that relays the signals between the WAN base stations 110 and the UEs 107. In general a relay node 130 receives a first wireless signal 115 from a WAN base station 110 and retransmits the signal as a second wireless signal 117. In some implementations, the relay nodes 130 shift the frequency of signals 115 from the external WANs to a frequency band suitable or available for communicating within the LAN. Such suitable or available frequency bands can include, for example, licensed or unlicensed frequency bands or other locally suitable under-used or unused frequency bands. In some implementations, the relay LAN 125 can be configured to support multiple RATs. For example, the same relay LAN 125 can be used to relay signals from GSM and UMTS base stations to respective UEs. In that sense, the relay LAN 125 can be transparent to the RAT or cellular access technology. This can provide the advantage of deploying one relay LAN 125 in a given sub-region 120 to service different UEs that subscribe to various networks, some or all of which may use different RATs.

In some implementations, a WAN 105 can be unaware of the operation of the relay LAN 125. In that sense the relay LAN 125 can be transparent to the WAN and the corresponding base stations 110. In some implementations, the relay LAN 125 can also operate in communication with a WAN 105 such that the WAN 105 is aware of resources available at the relay LAN 125. In such cases, a base station 110 corresponding to the WAN 105 and a relay node 130 of a relay LAN 125 can exchange control signals. Such control signals can include, for example, availability and usage information of radio resources at the base station 110 or the relay 130.

In some implementations, a relay node 130 can be configured to monitor radio resources within the relay LAN 125. For example, the relay node 130 can be configured to monitor what portions of a frequency spectrum are available for communicating with other relay nodes or UEs over the relay LAN 125. In some implementations, the relay node 130 can determine under-used or unused frequency bands that are available to communicate over the relay LAN 125. In this implementation, for example, the relay nodes within the LAN may monitor the frequency resource usage by the WANs operating within their vicinity and choose a suitably unused resource. The available frequency bands can be within a licensed spectrum, an unlicensed spectrum or a combination thereof. In some implementations the relay LAN 125 or its relay nodes 130 may communicate with external networks (e.g. WAN 105) or other information sources to determine which frequency resources are available for use. In some implementations the relay LAN 125 or its relay nodes 130 may be preset with a set of available frequency resources when they are installed or thereafter.

Figure 2:
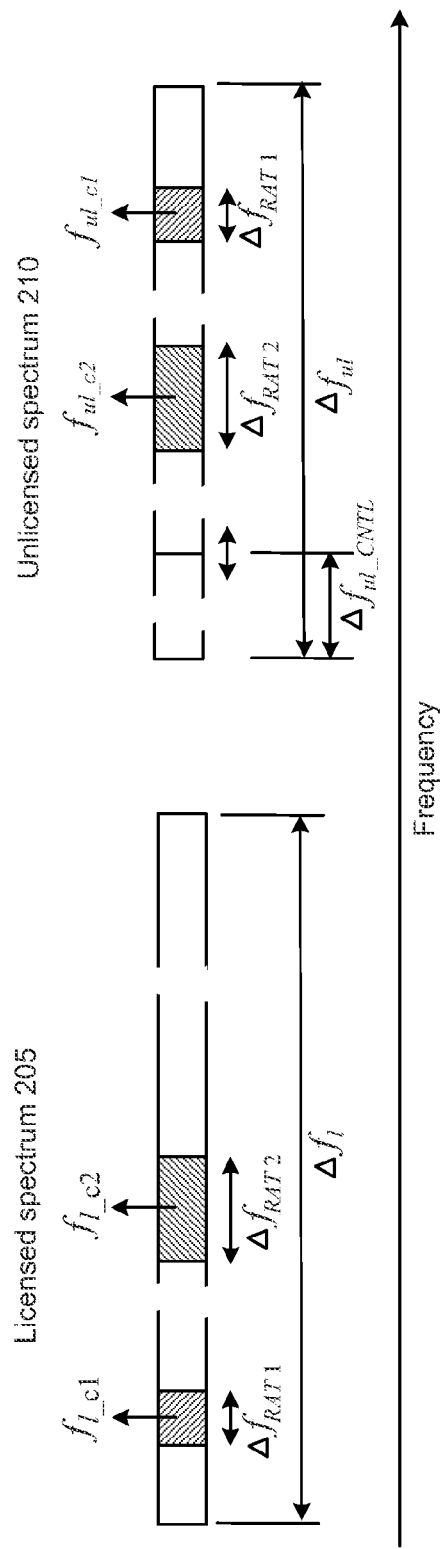
FIG. 2 is a schematic diagram showing an example of spectrum usage by a wireless network system.

FIG. 2 shows an example of spectrum usage by a wireless network system. In this example, the WAN base stations (corresponding to various RATs) in the vicinity of the relay LAN operate using a licensed spectrum 205 of total bandwidth $\Delta f_l$. The relay LAN 125 operates over an unlicensed spectrum 210 of bandwidth $\Delta f_{ul}$. The various RATs (e.g. RAT1 and RAT2) operate using licensed spectra of bandwidth $\Delta f_{RAT1}$ and $\Delta f_{RAT2}$, respectively. In particular, RAT1 operates over the band $f_{l\_c1} \pm \Delta f_{RAT1}/2$. In this example, a set of relay nodes can assist a UE which is connected to the RAT1 network by transmitting the signal over the band $f_{ul\_c1} \pm \Delta f_{RAT1}$. Within the band utilized by the relay nodes, a portion of the spectrum, $\Delta f_{ul\_CNTL}$, can be dedicated to control signaling for communicating with the WAN base stations and for inter-relay node communication. In some implementations, such relay network control functions can also be accommodated in other channels or frequency bands that do not necessarily overlap with bands over which user signalling and data is communicated.

The example in FIG. 2 shows that the WANs operate using dedicated channel assignments in a licensed spectrum 205 while the relay LAN operates over opportunistic unlicensed spectrum 210. However, it should be noted that either or both of a WAN and the relay LAN can operate over licensed or unlicensed frequency bands without deviating from the scope of this application. For example, the methods and systems described herein can also be used in situations where hybrid assignments of licensed and unlicensed frequency bands (possibly in diverse areas of the radio frequency spectrum range) are used.

The relay node 130 can also be configured to communicate with one or more other relay nodes in the relay LAN 125. In such cases, one or more additional relay nodes 130 can cooperate with the relay node 130 in communicating with a UE 107. In such cases, multiple relay nodes 130 can service a same UE. Alternatively, the relay nodes 130 can communicate with each other to select a particular relay node for servicing a given UE.

In some implementations, the relay nodes 130 within a relay LAN 125 exchange control signals to share information on resource availability or usage. For example, if a particular relay node 130a is communicating with a particular UE, the relay node 130a can transmit a control signal that includes information such as identity of the UE, frequency band used for the communication and transmission power used for the communication. A second relay node 130b can cooperate with the first relay node 130a in communicating with the particular UE, based at least in part on the control signal transmitted by the relay node 130a. For example, the second relay node 130b, can communicate with the particular UE in parallel with the relay node 130a over a different frequency band to provide frequency diversity gain at the UE. Alternatively, the second relay node 130b can communicate with the UE over the same frequency band to provide spatial code diversity gain at the UE. In another example, the second relay node 130b may refrain from communicating with the particular UE on determining that the relay node 130a is satisfactorily communicating with the UE. The relay node 130a can use the transmitted control signal to indicate such satisfactory communication, for example, by indicating a low transmission power. In some implementations, control signals transmitted by a relay node 130 include a beacon signal which is transmitted to indicate an availability of the relay node to assist UEs.

The relay nodes 130 can be deployed in various parts of the sub-region 120. For example, if the sub-region 120 is a building, the relay nodes 130 can be mounted on windows, walls or any other convenient locations within the building premises. In some implementations, the relay nodes 130 are deployed at the periphery of the sub-region 120. Both uplink (UL) and downlink (DL) transmissions between the WAN 105 and a UE 107 can be assisted by the relay LAN 125. In general, the relay nodes 130 are deployed at locations where there is acceptable signal strength from a WAN base station and from where coverage within the sub-region 120 can be provided. In some implementations, a relay node 130 is deployed within the coverage area of at least another relay node. In such cases, one relay node can be used to receive and retransmit signals from at least another relay node.

In some implementations, the relay nodes 130 forward wireless signals from one or more WAN 105 to the UEs 107 during DL transmissions. The relay nodes 130 can also forward wireless signals from the UEs 107 to the corresponding WANs during UL transmissions. In some implementations, during either or both of the UL and DL, a relay node 130 performs additional processing of the received wireless signals. The additional processing can include, for example, frequency translation, amplification and re-transmission. In some implementations, due to a finite delay introduced by the additional processing, the signals from a relay node 130 provide delay diversity in addition to the improved signal strength. In some implementations, the additional processing can also include one or more of channel coding, noise cancellation, and equalization.

In the UL direction, i.e. during a communication from a UE 107 to a WAN base station 110, a relay node 130 can act as an opportunistic transmit antenna port for the UE 107. In some implementations, when multiple relay nodes cooperate with the UE 107 in the UL transmission, each antenna of the cooperating relay nodes act as a separate transmit antenna for the UL transmission, thereby providing the UE with multiple antenna diversity. For example, if M relay nodes cooperate with an transmission from the UE 107, and $N_R$ represents the number of transmit antennas at each relay node, the UE 107 (which can have, for example, $N_U$ transmit antennas) can be augmented with $MN_R$ additional transmit antennas.

In general, a plurality of UEs 107 communicates with their corresponding base stations via the relay LAN 125. The UEs 107 can include, for example, a mobile phone, a pager, a two-way radio, a personal digital assistant (PDA), a mobile internet device, a laptop computer, a netbook, or a wireless internet card. In some implementations, the UE 107 can be configured to receive and combine signals both from a WAN 105 as well as the relay LAN 125. In some implementations, the UE 107 need not be equipped with multiple base-band receivers because the signals from the WAN band and the relay LAN operation band can be down converted together for base-band processing. In some implementations, the UE 107 can be configured to receive and combine (for example, using a coherent receiver) wireless signals from multiple relay nodes 130.

In an example operation, the relay LAN 125 can monitor the WANs 105 and update the spectrum usage or availability information for the relay LAN 125. In some implementations, one or more relay nodes 130 of the relay LAN 125 monitors the WAN specific (or RAT specific) UL channels to identify UEs that may require assistance from the relay LAN 125.

In some implementations, a UE 107 can be registered with a WAN base station 110a. The UE 107 can have an established active DL or UL transaction with the corresponding WAN. Alternatively, the UE 107 can be in an idle mode, periodically or intermittently monitoring DL transmissions from the base station 110a. In some cases, the UE 107 can also be switched off and have no communication with any WAN base station.

The UE 107 can then move into the sub-region 120 (or another region of poor coverage) where a relay LAN 125 is deployed. The UE 107 can be in an active, idle or switched off state when moving into the sub-region 120. If the UE 107 is in an active state, the periodic or aperiodic feedback over UL can be detected by one of the relay nodes 130 in the vicinity. If the UE 107 is in an idle state, the UE 107 may detect degradation in the received DL signal power or quality from the base station 110a. If the signal power or quality is below a certain threshold, the UE 107 can start a cell-selection/reselection procedure. If the UE does not find any other suitable base station, the UE 107 can continue to be registered with the most recent base station 110a. In some cases, when the UE 107 wants to initiate an active transaction, the UE 107 can initiate a random access procedure, which can be detected by a relay node 130 in the vicinity.

In some implementations, the relay nodes 130 may already be transmitting beacon and other control signals, for example, to assist other UEs in the sub-region 120. In some implementations, the relay nodes 130 can initiate their beacon and broadcast channels upon detecting UL signaling from a UE. This can be done, for example, in implementations where the beacon and other control signaling are turned off for power saving when not in use. At the UE end, when the signal quality from the base station 110 drops below an acceptable level, the UE 107 can be configured to search for the beacons or other control signals. In some implementations, when a UE 107 is switched on after moving into the sub-region 120, the UE 107 can send UL signals upon detecting at least some DL transmission from a base station 110. If the beacon or other control signals of the relay LAN 125 are originally turned off, such signals can be turned on based on detecting the UL signals from the UE 107. In some implementations, when the UE 107 is switched on after moving into the sub-region 120 and does not detect any DL transmission from a base station 110, the UE 107 can also be configured to transmit a predetermined control signal to communicate with the relay LAN 125. The beacon and other control signals of the relay LAN 125 can also be turned on responsive to detecting such predetermined control signal from the UE 107.

In some implementations, the UE can initiate cooperation request with the relay LAN 125. A relay node 130 in the vicinity may communicate with the UE 107 upon receiving such a cooperation request. The relay node 130 can then cooperate with the other relay nodes in the relay LAN 125 to establish a cooperative link with the UE 107 such that the cooperation across the relay nodes 130 of the relay LAN 125 results in an efficient usage of available radio resources.

Once the UE 107 and a relay node 130 have established a communication, the relay node 130 can rebroadcast the DL signals from an appropriate base station 110 on a local frequency band suitable for use within the relay LAN 125. The UE 107 can receive the signals on either or both of the WAN frequency band and the local frequency band. The relay node 130 can also rebroadcast the UL signals from the UE 107 to the WAN base station 110. In some implementations, the UE 107 cooperatively communicates with the WAN base station 110 and the relay LAN 125 to improve performance on both DL and UL paths. The transmit power of the signals transmitted from the relay node 110 can be controlled such that an acceptable performance gain is obtained. In some cases the UE 107 can experience further signal loss from the WAN and hence receive only the relayed signal from the relay node 110.

Figure 3A:
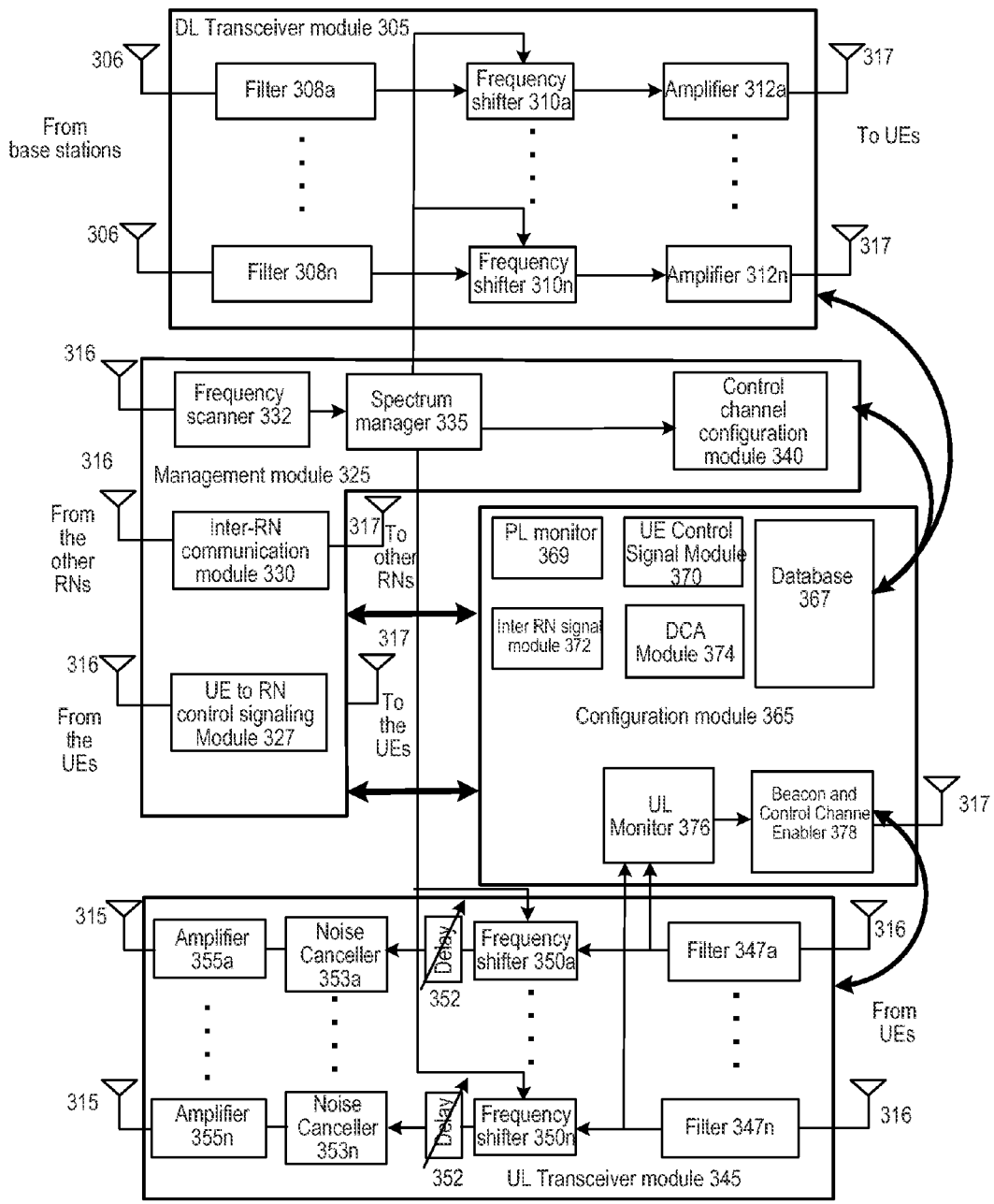
FIG. 3A is a block diagram of an example of a relay node.

FIG. 3A shows a block diagram of an example of a relay node 300. The relay node 300 can be used for various time based (e.g. TDMA) and frequency based (e.g. frequency division multiple access FDMA, or OFDM) systems. In some implementations, the relay node 300 can be used as one of the relay nodes 130 described with reference to FIG. 1. The relay node 300 includes a DL transceiver module 305, and a management module 325. The relay node 300 can also include one or more of a UL transceiver module 345 and a configuration module 365. In some implementations, the configuration module 365 can be a part of the management module 325.

In general, the DL transceiver 305 relays wireless signals between a WAN base station 110 and a UE 107. In some implementations, relaying the signal can include processing the signal from the WAN base station 110 by performing one or more of a filtering, frequency shifting, amplifying and retransmitting the processed signal for a UE 107 to receive. In some implementations, the DL transceiver 305 includes additional modules for performing one or more of these functions. For example, the DL transceiver 305 can include one or more filters 308a-308n (308 in general) that filter a wireless signal from the WAN base station 110 to convert the signal to a baseband signal. The filter 308 can be a tunable filter that can be tuned to receive signal from a particular WAN operating in accordance with a particular RAT. For example, the tunable filter 308 can be tuned as a bandpass filter that suppresses frequencies outside a band allocated to a particular WAN. In some implementations, each of the filters 308 can be tuned to receive wireless signals from a different WAN 105. In some implementations, more than one filter 308 can be used for receiving signals from a particular WAN 105. The DL transceiver 305 can also include one or more frequency shifters 310a-310n (310 in general) to shift the received wireless signal to a different frequency band. In some implementations, the frequency shifter 310 shifts the frequency of a received wireless signal to a band that can be used to communicate over the relay LAN 125. The DL transceiver can also include one or more amplifiers 312a-312n (312 in general) to amplify the frequency shifted signals prior to transmission. The DL transceiver can also include one or more receiver antennae 306 to receive wireless signals from the WANs 110 and one or more transmitter antennae 317 to transmit the frequency shifted and amplified signals over the relay LAN 125. In some implementations, the DL transceiver can communicate with the management module 325 or the configuration module to determine one or more parameters related to the filtering, frequency shifting, amplifying, or transmitting. For example, the management module 325 can provide the DL transceiver with frequency bands available for communication over the relay LAN 125 and the configuration module 365 can provide the DL transceiver 305 with amplifier gains based on control signals from other cooperating relay nodes.

In some implementations, the relay node 300 includes a management module 325 that manages how the relay node 300 communicates with the UEs 107 or other relay nodes within the relay LAN 125. In general, the management module 325 performs one or more of spectrum management and cooperation control with UEs and other relay nodes. In some implementations, the management module 325 includes a UE to relay node (RN) control signaling module 327 that facilitates control signaling with different UEs 107. For example, the UE to RN control signaling module 327 can send control messages to initiate cooperation between a UE 107 and the relay node 300. In some implementations, the module 327 receives cooperation requests from a UE 107, forwards the request to the configuration module 365 and transmits responses from the configuration module 365 to the UE 107. The UE to RN control signaling module 327 can receive the requests from UEs through a receiver antenna 306 and transmit the responses through a transmitter antenna 317.

The management module 325 can also include an inter-relay node communication module 330 that exchanges control signals with other relay nodes in the relay LAN 125 via a receiver antenna 306 and a transmitter antenna 315. These control signals can be used to coordinate resource usage and manage inter-relay node interference control. In some implementations, the module 330 receives a control message from another relay node within the LAN, forwards the request to the configuration module 365 and transmits response message from the configuration module 365 to the other relay nodes using, for example, a transmit antenna 317.

The management module 325 can further include a spectrum manager 335 that manages the available local frequency bands based on, for example, current spectrum usage information. The spectrum usage information can include, for example, (1) RAT spectrum usage by the WANs, (2) Local area spectrum usage for the DL/UL cooperation within the relay LAN 125 and (3) a relay node's capability of operating over multiple frequency bands. The RAT spectrum usage can be determined using a frequency scanner 332 that scans received wireless signals to determine what frequencies or frequency bands are being used. For example, the frequency scanner 332 can determine frequency bands used by the WANs as well as frequency bands available for communication over the relay LAN 125. The functionality of the frequency scanner 332 may also include identifying the RATs operating the WAN in its proximity. The management module 325 can also include a control channel configuration module 340 that communicates with the spectrum manager 335 and the configuration module 365 to configure channels used for control signaling to communicate with the UEs 107 or other relay nodes.

The configuration module 365 manages the broadcast or beacon signals, control channels and messages used to initiate cooperative links on DL and UL paths. The configuration module 365 can include one or more sub-modules for performing the various functions of the configuration module 365. For example, the configuration module 365 can maintain a database 367 where resource usage information from different UEs 107 and other relay nodes are stored. Information stored in the database 367 can be provided to other modules. For example, the database 367 can store transmission power information from other relay nodes and provide such information to the amplifier 312 as a gain control parameter. In another example, the database 367 can store information on frequency usage by other relay nodes and provide such information to the control channel configuration module 340. The control channel configuration module 340 in turn can use such information in conjunction with an input from the spectrum manager 335 to configure control signals for UEs 107 or other relay nodes.

The configuration module 365 can also include other sub-modules such as a PL monitor 369, a UE control signal module 370, and inter-relay node signaling module 372 and a DCA module 374. The configuration module 365 can also include an UL monitor 376 that monitors UL channels for communicating with specific WANs.

PL monitor 369 measures and monitors the path loss (PL) with respect to WAN base stations in its vicinity and also with respect to the UEs which are being actively assisted by the LAN. The PL monitoring function may be coordinated among all the relay nodes within the LAN. The path loss measured may be used to decide an appropriate transmit power for cooperative transmission from a relay node, for example, by setting the gain of amplifiers 312.

In some implementations, the UE control signal module 370 receives UE requests forwarded by the management module, 325 and responds with channel descriptors and specific messages. In some implementations, the Inter relay node signaling module 372 receives requests from other RNs forwarded by the management module, 325 and responds with information such as the channel configuration for UE assistance. The specific inter-relay node signaling can include the identity of the UE and corresponding cooperation configuration parameters, which can be obtained, for example, from the database, 367.

Dynamic channel assignment (DCA) module 374 assigns the channels which are suitable for communication, either with another relay node within the LAN or with a UE which requires assistance. The decision of the DCA module 374 can be coupled with the functionalities of the spectrum manager 335 and frequency scanner 332 (as these modules can be configured to be aware of which channels are currently available and which are in use).

In some implementations, the UL monitoring module 376 monitors the UL channels of the WAN RATs, which are operating in the vicinity of the LAN. In some implementations, if UE requests on any of the UL channels are sensed by the relay node (for example, using the UL monitor 376), the relay node may enable transmissions over the beacon channels (for example, using the beacon and control channel enabler 378 that is connected to transmit antenna 317) so that the UE is aware of the presence of LAN for assistance.

In some implementations, the configuration module 365 can enable operation of the relay node 300 in a power saving mode where the module 365 refrains from transmitting beacon, broadcast or control signals in the absence of a UE that needs cooperation. In such cases, the configuration module 365 can be turned on to transmit the beacon, broadcast or control responsive to detecting a transmission from a UE in the sub-region 120. In some implementations, the configuration module 365 includes a beacon and control channel enabler 378 to broadcast the beacon and control signals.

In some implementations, the relay node 300 includes a UL transceiver 345 that can be used to filter a wireless signal from the UE 107 from within the sub-region 120 and relay the received signal to a WAN base station 110. In some implementations, the UL transceiver 345 processes received signals by performing operations such as frequency translation, amplification and transmission. The UL transceiver 345 can include one or more filters 347a-347n (347 in general) to receive wireless signals from one or more UE 107. The UL transceiver 345 can also include one or more frequency shifters 350a-350n (350 in general) to frequency shift received wireless signals to other frequency bands. For example, the frequency shifters 350 can shift the received wireless signals to a frequency band appropriate to communicate with a corresponding WAN base station 110. In some implementations, the UL transceiver 345 can appropriately delay the received wireless signals using delay elements 352. The UL transceiver 345 can also include one or more amplifiers 355a-355n (355 in general) to amplify the frequency shifted signal to be transmitted. In some implementations, the UL transceiver 345 can include one or more of a receiver antenna 316 for receiving a transmission from a UE, a transmit antenna 315 to transmit a signal to a base station of a WAN, a filter 347, a frequency shifter 350, a delay element 352, an amplifier 355, and the noise canceller the 353 for each WAN 110 serviced by the relay node 300. The receiver antenna 316 substantially different from the receiver antenna 306 used to receive signals from a WAN base station. Similarly, the transmit antenna 315 can also be substantially different from the transmit antenna 317 used to transmit a signal to a UE. In some implementations, the UL transceiver 345 can communicate with the management module 325 or the configuration module 365 to determine various parameters related to the processing performed by the UL transceiver 345. In some implementations, the UL transceiver 345 includes one or more noise cancellers 353a-353n (353 in general) to cancel noise introduced in the frequency bands used for communicating over the relay LAN 125. An example of such a noise canceller is described next with reference to FIG. 3B.

Figure 3B:
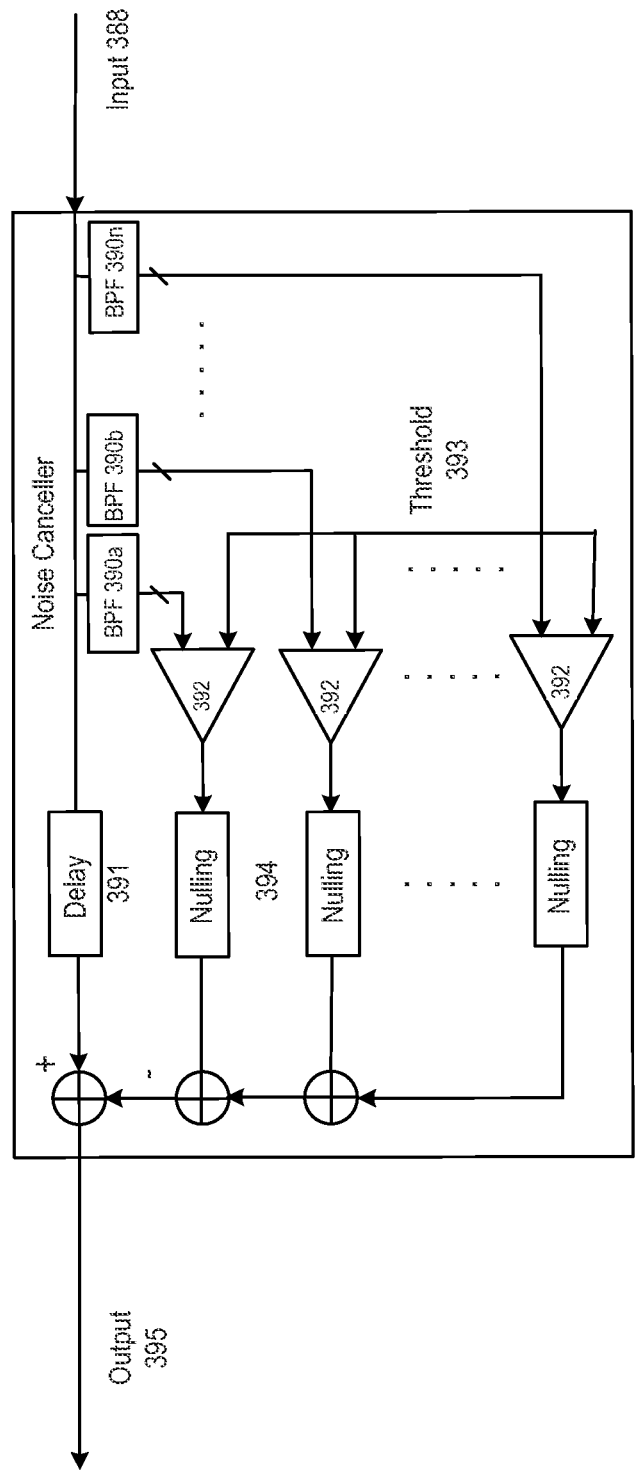
FIG. 3B is a block diagram of an example of a noise canceler.
Figure 3C:
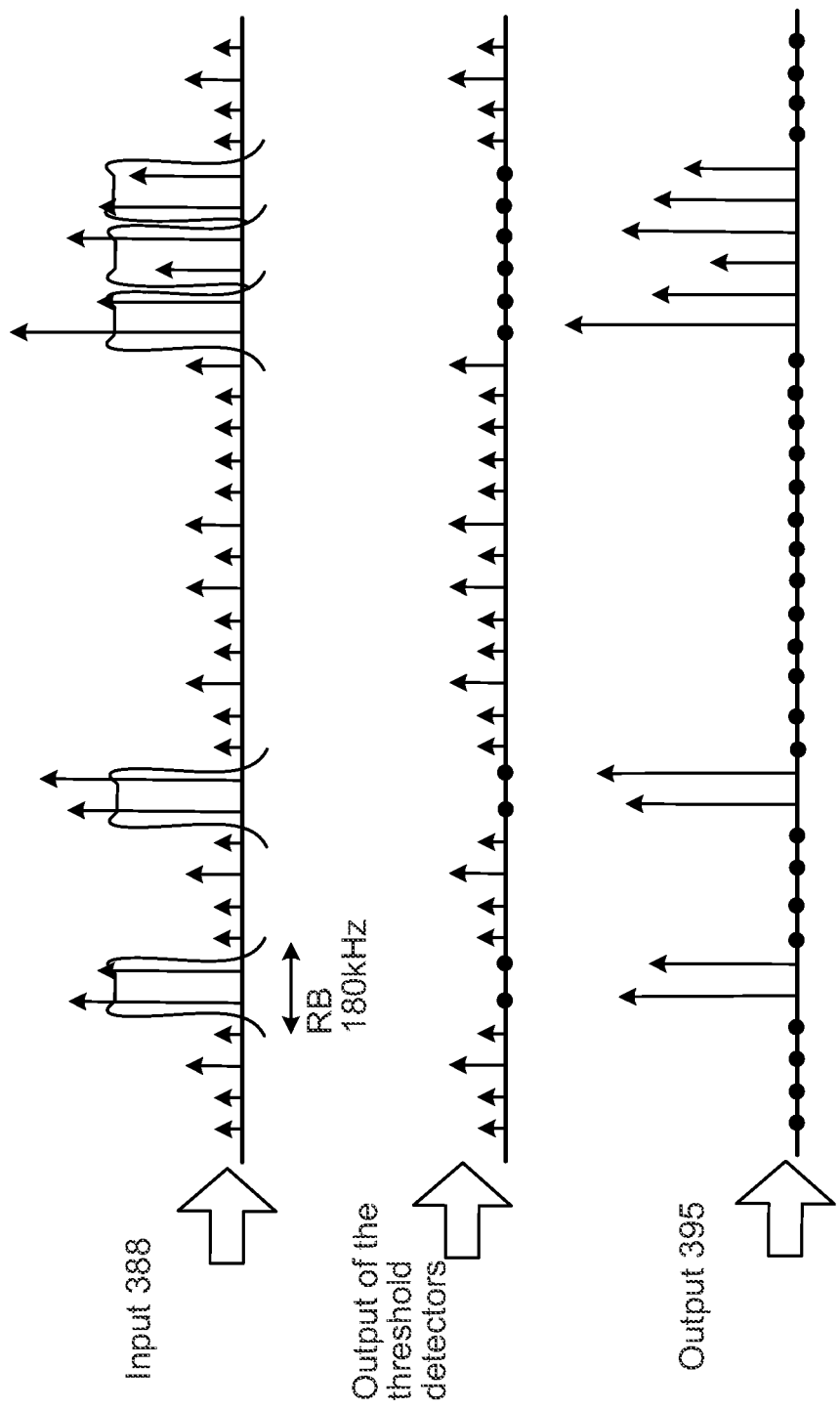
FIG. 3C is a set of plots illustrating an example of noise cancellation.

In some implementations, when the relay node 300 is cooperating during a UL transmission from a particular UE 107, additional noise can be introduced into the subcarriers of other UEs. The subcarrier assignments for the other UEs can be interleaved with those of the UE 107 being assisted by the relay node 300. The other UEs can be in coverage areas of the corresponding WANs or they can be assisted by another relay node from the relay LAN 125. During signal amplification by an amplifier 355, additional noise and signal dependent distortion can be introduced in the other subcarriers. In some implementations, a noise canceller 353 (an example of which is shown in FIG. 3B) can be used to suppress the additional noise introduced into the other subcarriers such that the noise does not affect the WAN signal transmitted by the UL transceiver of other UE not being assisted by the relay node 300. This noise canceller 353 can operate by detecting the occupied sub-carriers of the UE 107 assisted by the relay node 300. To be detected, the transmit power of these subcarriers can be set above a threshold level, or can be chosen based on information about the radio resource blocks granted to the UE 107. In this example, the output of the delay circuit 352 or the frequency shifter 350 is the input signal 388 which is passed through bank of band pass filters (BPFs) 390a-390n (390 in general). A threshold detector 392 at the output of each BPF 390 suppresses signals which are above a threshold 393. For example, the output of the comparator can be substantially equal to zero when the output of a BPF 390 is above the threshold 393 (indicating a presence of a signal in the passband that is to be relayed). The pass band of the BPF 390 can be set according to the OFDMA subframe structure defined for the corresponding specific RAT. For example, the pass band of the BPF 390 can be set to 180 kHz in the case of LTE (which corresponds to the bandwidth of one resource block). In some implementations, the bandwidth of the BPF 390 can be set to the minimum bandwidth that can be assigned to a UE 107. The output of the bank of threshold detectors 392 (representing unwanted "noise" signals that should not be relayed) is subtracted from the input signal 388 to produce the output 395 of the noise canceller 353. A set of plots illustrating an example of the noise cancellation is shown in FIG. 3C. In some implementations, the nulling units 394 can be used to set the appropriate gain levels before the subtraction. The delay unit 391 can be provided to delay the input signal 338 in accordance with the combined time delay in the associated BPF 390 and threshold detector 392. The threshold level can be determined based on a memory based parameter and adjusted based on an overall signal strength to reduce the amount of distortion and enhance the system performance. In an alternative arrangement, noise cancellation can also be achieved by placing an adaptive filter to learn distortion at the output of the BPFs 390 and predict the noise statistics for the next time frame.

Even though FIG. 3A shows various modules and submodules of the relay node 300, functionalities of one or more of these modules and submodules can be combined. For example, even though FIG. 3A shows a plurality of receiver antennae 306, 316 and transmitter antennae 315, 317, one such antenna can be used for more than one module.

Figure 4A:
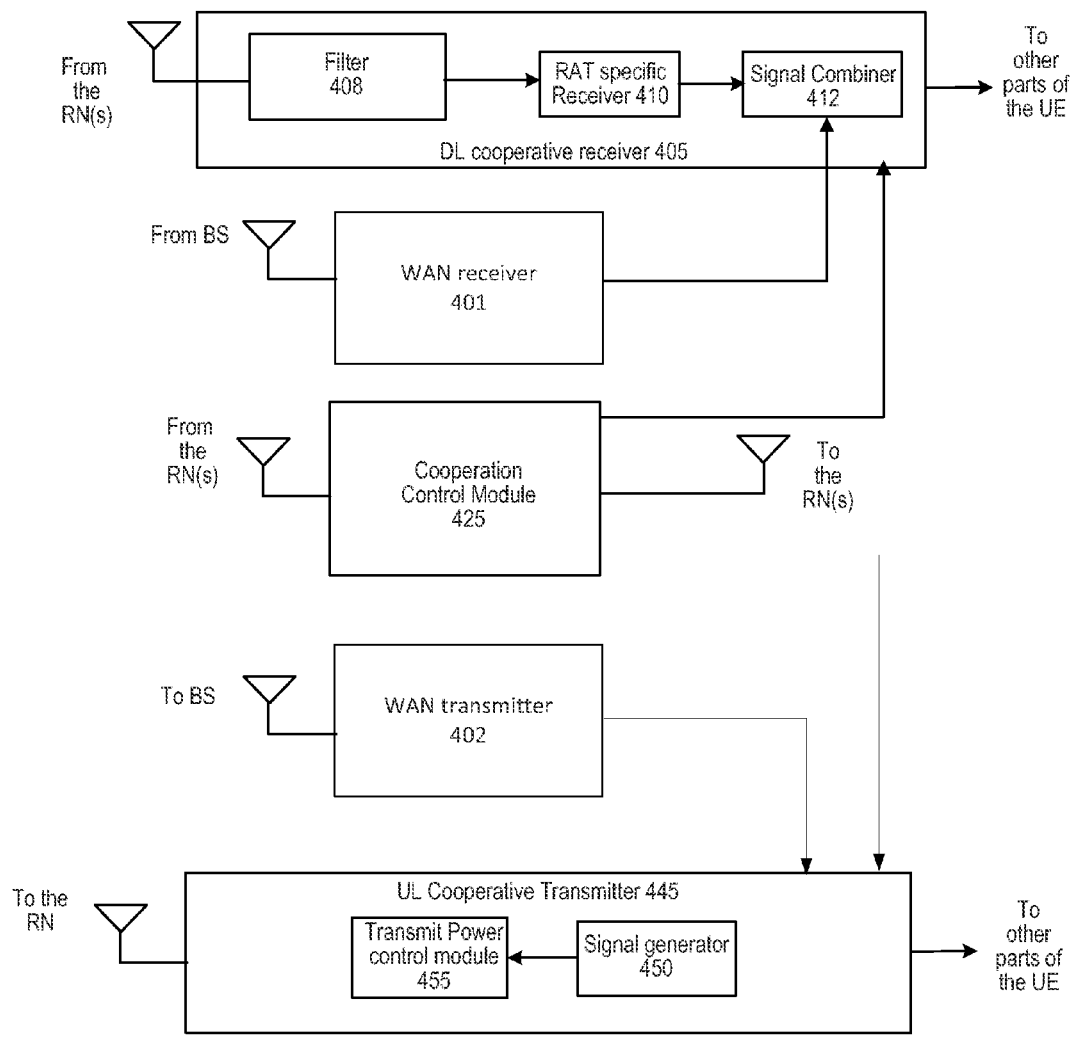
FIG. 4A is a block diagram of an example of a user equipment (UE).

FIG. 4A shows a block diagram of an example of the radio transceiver portion of a UE 400. In some implementations, the UE 400 can be substantially similar to the UE 107 described above with reference to FIG. 1. In addition to a WAN receiver 401 and a WAN transmitter 402, the UE 400 includes a DL cooperative receiver 405 to receive signals transmitted by a relay node 130 over a relay LAN 125. The UE 400 can also include a UL cooperative transmitter 445 to transmit wireless signals to one or more relay nodes 130. The UE 400 also includes a cooperation control module 425 that initiates a communication with a relay node 130. The WAN receiver 401 and the WAN transmitter 402 communicate with the base station 110 that the UE is registered with The DL cooperative receiver 405 can include a filter 408 that processes wireless signals received from a relay node 130 over the relay LAN 125. The received wireless signals are transmitted by the relay node 130 using one of the frequency bands suitable for communicating over the relay LAN 125. In some implementations, the filter 408 is a bandpass filter whose bandwidth depends on the bandwidth used by the WAN 105 that the UE subscribes to. In some implementations, the bandwidth of the filter 408 is substantially similar to the bandwidth of a corresponding filter 308 used in the DL transceiver 305 of the relay node. In some implementations, the filter 408 can be a digital or analog filter that is tunable in center frequency and bandwidth. The DL cooperative receiver 405 can also include a RAT specific receiver 410 to decode the signal received over the relay LAN 125. For example, if the wide area network RAT used by the UE is CDMA or GSM, the RAT specific receiver 410 is a CDMA receiver or GSM receiver, respectively. The DL cooperative receiver 405 can further include a signal combiner 412. In some implementations, substantially same data packets are received at the UE 400 both over the WAN (as a first wireless signal at the WAN receiver 401) and the relay LAN 125 (as a second wireless signal at the DL cooperative receiver 405). In such cases the signal combiner 412 can combine the outputs of the WAN receiver 401 and the RAT specific receiver 410. The signal combiner 412 can use various coherent signal combination techniques such as maximal ratio combination or equal gain combination. In some implementations, non-coherent combination techniques such as selection combining or switched combining can also be used. In some imple-mentations, the signal combiner 412 can also be implemented as a part of the RAT specific receiver 410. In general, combining a plurality of received signals can provide the advantage of achieving diversity gain in the DL path as illustrated by the following example analysis.

In this example, the serving base station sends to the UE 400 a signal $S_B(k)$ at time k over a corresponding WAN, for example, using LTE RAT. If the path loss between the base station and the UE is $L_{BM}$, the received signal at the UE can be expressed as follows:

$$R_{MB}(k;f_{l\_c}) = \sqrt{L_{BM}} C_{BM}(k) S_B(k) + N_M \quad (1)$$

where $C_{BM}$ is the channel weight (assuming flat fading in this example), $N_M$ is the noise at the UE. In this example all interference from other sources is included in the noise $N_M$. The term $f_{l\_c}$ is the carrier frequency.

Similarly, the signal received at the relay node can be expressed as:

$$R_R(k;f_{l\_c}) = \sqrt{L_{BM}} C_{BR}(k) S_B(k) + N_R \quad (2)$$

where $C_{BR}$ is the channel weight, $N_R$ is the noise (also including other interfering signals) at the relay, and the path-loss between the base station and the relay node is $L_{BR}$.

The downlink cooperative transmission from the relay node can be sent using a selected frequency band suitable for communication over the relay LAN 125. The relay node 400 receives the downlink transmission from the WAN base station 110 and translates the frequency of the received signal to the local area channel and transmits to the UE after appropriately amplifying the frequency shifted signal. The relay node 400 can manage the available local area spectrum using the spectrum manager 335 described with reference to FIG. 3A. The available local area spectrum is managed in a distributed way among all the available relay nodes operating in the relay LAN 125. In some implementations, a signal from the WAN is received at the relay node 400 where the received signal can be frequency shifted, filtered and transmitted to the UE over the relay LAN 125. In some implementations, the transmitted signal from the relay node 400, $S_R(k)$ can be expressed as follows:

$$S_R(k) = A(\sqrt{L_{BR}} C_{BR}(k) S_B(k) + N_R) \quad (3)$$

where $C_{BR}$ is the channel weight (assuming flat fading in this example), $N_R$ is the noise at the relay node. In such cases, the received signal at the UE can be expressed as follows:

$$R_{MR}(k;f_{ul\_c}) = A\sqrt{L_{RM}} C_{RM}(k)(\sqrt{L_{BR}} C_{BR}(k) S_B(k) + N_R) + N_M \quad (4)$$

where $f_{ul\_c}$ is the carrier frequency used by the relay node and A is the signal amplification applied by the relay node.

The above equation can be further simplified as follows:

$$R_{MR}(k;f_{ul\_c}) = A\sqrt{L_{RM}L_{BR}} C_{RM}(k) C_{BR}(k) S_B(k) + \{A\sqrt{L_{RM}} C_{RM}(k) N_R + N_M\} \quad (5)$$

or $$R_{MR}(k;f_{ul\_c}) = A\sqrt{L} C(k) S_B(k) + N_E \quad (6)$$

where $$L = L_{RM} L_{BR}; \ C(k) = C_{RM}(k) C_{BR}(k) \text{ and } N_E = A\sqrt{L_{RM}} C_{RM}(k) N_R + N_M \quad (7)$$

In this example, the probability distribution of C(k) may be considered to be a complex Gaussian and $C_{RM}(k)$ is constant or semi-static. Continuing with the example, the combined received signal at the UE can be expressed as follows:

$$R_M(k) = R_{MB}(k;f_{l\_c}) + R_{MR}(k;f_{ul\_C}) \quad (8)$$

Therefore, in this example, the UE receives the signal $R_M$ and obtains two complex baseband signals, $U_0(k)$ and $U_1(k)$ given by:

$$U_0(k) = A\sqrt{L} C(k) S_B(k) + N_E \quad (9)$$

$$U_1(k) = \sqrt{L_{BM}} C_{BM}(k) S_B(k) + N_M \quad (10)$$

Figure 4B:
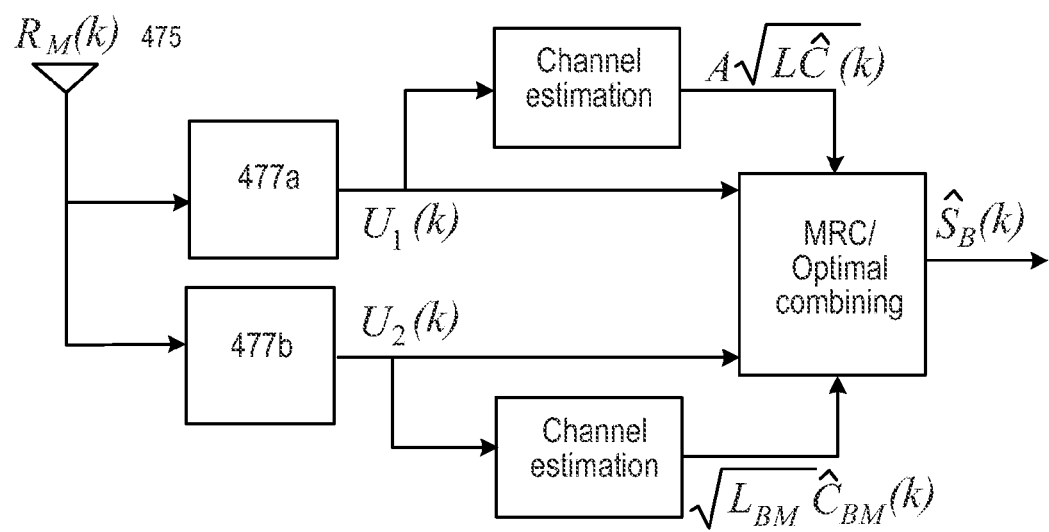
FIGS. 4B and 4C are block diagrams of receivers.
Figure 4C:
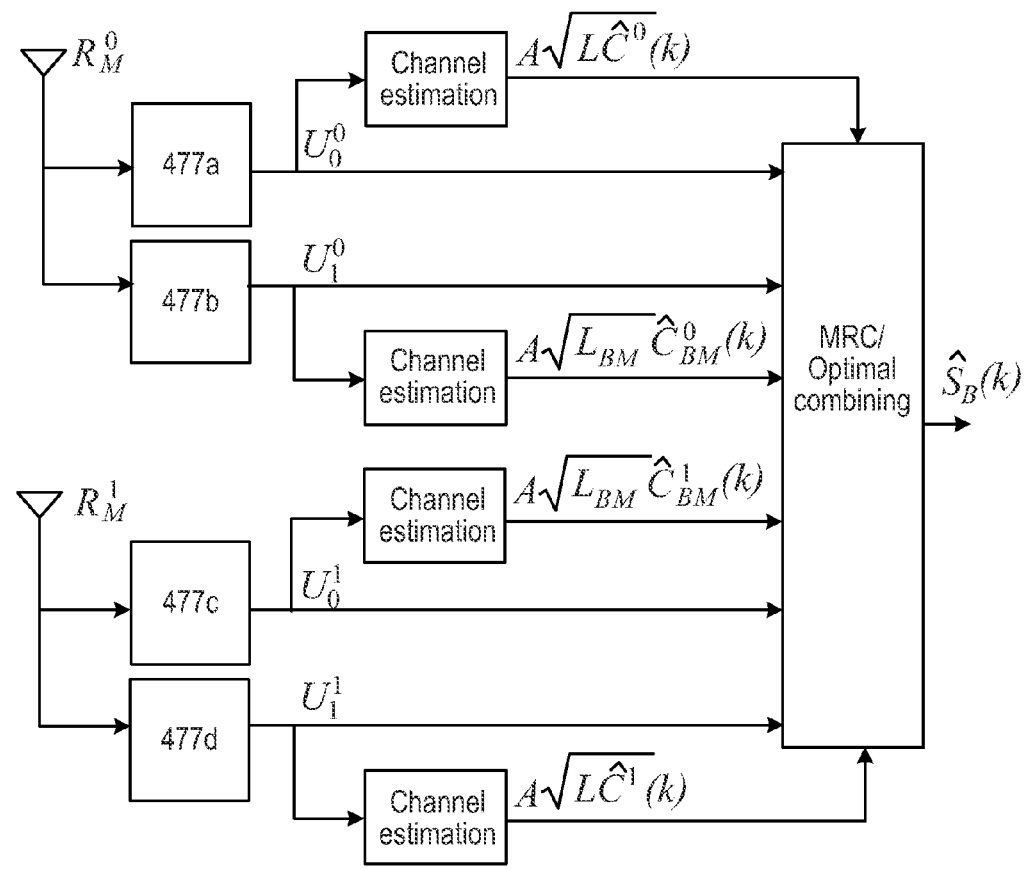

In some implementations, channel estimation can be performed independently over the two base band signals and they can be combined, for example, coherently, to benefit from diversity gain. In some implementations where $A\sqrt{L} = \sqrt{L_{BM}}$ and $N_M \approx N_E$, then as shown in the above equations, a high diversity combining gain can be achieved. FIG. 4B and FIG. 4C show examples of receiver structures for single and dual antenna reception, respectively, at the UE. In some implementations, other configurations of receivers such as equal gain combining or received power based selection combining can also be used.

FIG. 4B is a block diagram of an example of a single antenna receiver that can be used at the UE. In some implementations, a multiple antenna receiver (an example of which is shown in FIG. 4C) can also be used. In some cases, a multiple antenna receiver can result in better reception at the UE. Referring again to FIG. 4B, the received signal $R_M(k)$ 475 can be filtered with two band pass filters 477a and 477b centered at $f_{l\_c}$ and $f_{ul\_c}$, respectively. The bandpass filters 477a and 477b are typically pass band matched to the channel bandwidth $\Delta f_{RAT}$ of the corresponding RAT. The baseband waveforms at the output of the two band-pass filters $U_1(k)$ and $U_2(k)$ can be independently evaluated for channel estimation using, for example, known pilot/reference symbols transmitted as part of an OFDM sub-frame. The transmitted symbols can be estimated, for example, by coherently combining the two baseband waveforms $U_1(k)$ and $U_2(k)$ and the corresponding channel estimates. In some implementations, where $A\sqrt{L} = \sqrt{L_{BM}}$ and $N_M \approx N_E$, the performance of the receiver illustrated in FIG. 4B can approach a two branch optimal diversity combining, i.e. with one receive antenna, the UE can obtain a two branch diversity reception performance with the help of assistance from one relay node. This advantage can be generalized for a larger number of relay nodes assisting the UE as follows. Note that in some implementations, all the relay nodes can use one of several available orthogonal frequency bands for their cooperative transmissions. When assistance is available from multiple relay nodes, the signal transmitted by a WAN base station 110 can reach the UE following multiple paths, such as:

i) a path directly from the base station to the UE and
ii) one or more paths through one or more of N relay nodes assisting the UE.

In such cases, the reception performance at the UE can approach (N+1) branch diversity reception, for example, under at least some of the following conditions:

i) amplification at the individual relay nodes is adjusted such that the path loss over all the paths are approximately equal
ii) the effective noise plus interference at the UE is approximately equal.
iii) for relay nodes cooperating using the same channel or frequency band, the diversity gain depends on the number of resolvable paths based on the composite channel The above examples and analyses assume that the signal from a WAN base station 110 to a UE 107 in a sub-region 120 is frequency shifted by a relay node to a channel in the local area network spectrum. In some implementations, other configurations are also possible, for example, in which the relay node shifts the frequency of the WAN signal to multiple channels of the local area network spectrum. In some implementations, a multi-channel frequency shifting can have the advantage of providing additional channel diversity and spectrum bandwidth gain which may enhance the coverage in the sub-region 120. In some implementations, the multi-channel frequency shifting can also be used to compensate for one or more poor propagation characteristics of the relay LAN 125 or other local conditions. For example, a relay node may need to choose from resources available in 2.5 GHz and 700 MHz spectrum to retransmit the received signal from the WAN. Based on the LAN environment, the signal propagation at 2.5 GHz and 700 MHz may differ. For example, if the relay nodes are closely spaced, the 2.5 GHz spectrum can be used even though the path loss is relatively high. The spectrum resources can be reused by the relay nodes because of less inter-relay node interference at 2.5 GHz. However, using 700 MHz resources may be preferable for more widely spaced relay nodes as the path loss is relatively less for this band and the signals are less affected by shadowing. Using resources at both 2.5 GHz and 700 MHz may provide additional diversity gain due to the different shadowing, fading and path loss characteristics of the two bands.

In some implementations, the signal from the WAN base station can be received by multiple relay nodes of the relay LAN 125, each of which relays the signal to the UE. This can provide additional diversity and power gain to improve the signal quality at the UE. The multiple relayed signals (from different nodes) can be over the same frequency band. In some implementations, at least some of the multiple relayed signals can be in non-overlapping frequency bands, thereby providing additional frequency diversity. In some implementations, for example when the relay LAN environment is very noisy, the relay nodes can also introduce channel coding in the relayed signals. In such cases, the relay nodes can include a channel coding module and information on the channel coding can be shared with the UEs or other relay nodes by using appropriate control signals.

FIG. 4C shows a block diagram of a multi-antenna receiver that can be used at the UE. The multi-antenna receiver shown in this example includes two band pass filters for each antenna (477a and 477b for one antenna and 477c and 477d for the other antenna). In this example the relay nodes are assumed to have only one receive and one transmit antenna each. However, in some implementations, a relay LAN can include relay nodes with varying number of transmit and receive antennae.

Referring again to FIG. 4A, the UL cooperative transmitter 445 can transmit data over the frequency band of the relay LAN according to the wide area network RAT specific format. In some implementations, the UL cooperative transmitter 445 can include a signal generator to generate a signal to be transmitted over the relay LAN. In some implementations, the signal generator receives data to be transmitted from the WAN transmitter 402 and generates a corresponding signal using a frequency band suitable for communication over the relay LAN 125. In some implementations, the UL cooperative transmitter 445 also includes a transmit power control module that controls transmission power based on, for example, specifications of the corresponding RAT or network resources available for communication over the relay LAN. The UL cooperative transmitter 445 can communicate with the cooperation control module to generate the signal to be transmitted over the relay LAN.

In some implementations, the cooperation control module 425 can perform a cooperation initiation with a relay node 130. In some implementations, the cooperation control module can monitor the quality of signal received at the UE and based on the quality of the received signal, make a decision to request cooperation from the relay LAN 125. For example, if the cooperation control module 425 detects that the signal quality (or QoS) from a WAN base station 110 is below an acceptable level, a procedure to initiate a LAN cooperation can be initiated. In some implementations, the cooperation control module 425 can detect the presence of an available relay LAN by monitoring whether a beacon signal from a relay node is detected. If a beacon signal is detected, the cooperation control module 425 can transmit a request for cooperation from the relay LAN 125. In some implementations, this can include, for example, analyzing a received beacon signal to determine broadcast or control channels that can be used to exchange control signals with the relay LAN 125. In some implementations, the cooperation control module 425 can transmit the request for cooperation over a control channel identified by a beacon or broadcast signal from the relay LAN 125. The cooperation control module 425 can also be configured to monitor a particular frequency band (for example, based on information specified in a beacon signal) for a response of a relay node 130 to the cooperation request. In some implementations, the cooperation control module 425 establishes a communication link with a relay node 130 based on a response received from the relay node. The cooperation control module 425 can send, for example, an acknowledgement signal to the relay node on receiving the response to establish the communication link. Various cooperation credentials related to the communication link between the UE 107 and the relay node 130 can be exchanged using the control signals, for example, the cooperation initiation request, the response, or the acknowledgement signal. For example, the relay node 130 can specify radio resources (e.g. frequency bands, or transmission power that the UE can use) available to communicate over the relay LAN 125, in the beacon signal or the response signal. The cooperation control module 425 can specify, for example, the RAT or the WAN base station related to the UE, in the cooperation initiation request or the acknowledgement signal. On establishment of the communication link between the UE 107 and the relay node 130, the cooperation control module can coordinate with the DL cooperative receiver 405 or the UL cooperative transmitter 445 to manage reception and transmission, respectively, over the relay LAN 125.

The DL cooperative receiver 405, the UL cooperative transmitter 445 and the cooperation control module 425 can be implemented in various ways. In some implementations, these modules can be built into an UE. Alternatively, one or more of the DL cooperative receiver 405, the UL cooperative transmitter 445 and the cooperation control module 425 can be implemented as an accessory module (e.g. an integrated circuit chip, a circuit board, or an external card or dongle) that supplements the functionality of a UE that has, for example the WAN receiver 401 and the WAN transmitter 402. In some implementations, the accessory module can be connected to a UE using, for example, a micro or mini USB port, an USB port, an aircard slot, a memory card slot, or other appropriate connections that allows the accessory module to function in conjunction with other modules (e.g. WAN receiver 401 and WAN transmitter 402) of the UE.

The modules and submodules described above can be implemented as any combination of software and hardware. For example, a plurality of the modules described above can be implemented using one or more of a processor, a controller, a microcontroller, or a digital signal processor. The arrangement of the modules and sub-modules should not be considered limiting. For example, a particular sub-module of a given module may be implemented together with function- alities of a different module. Similarly, in some implementations, functionalities of different modules can be combined.

Figure 5A:
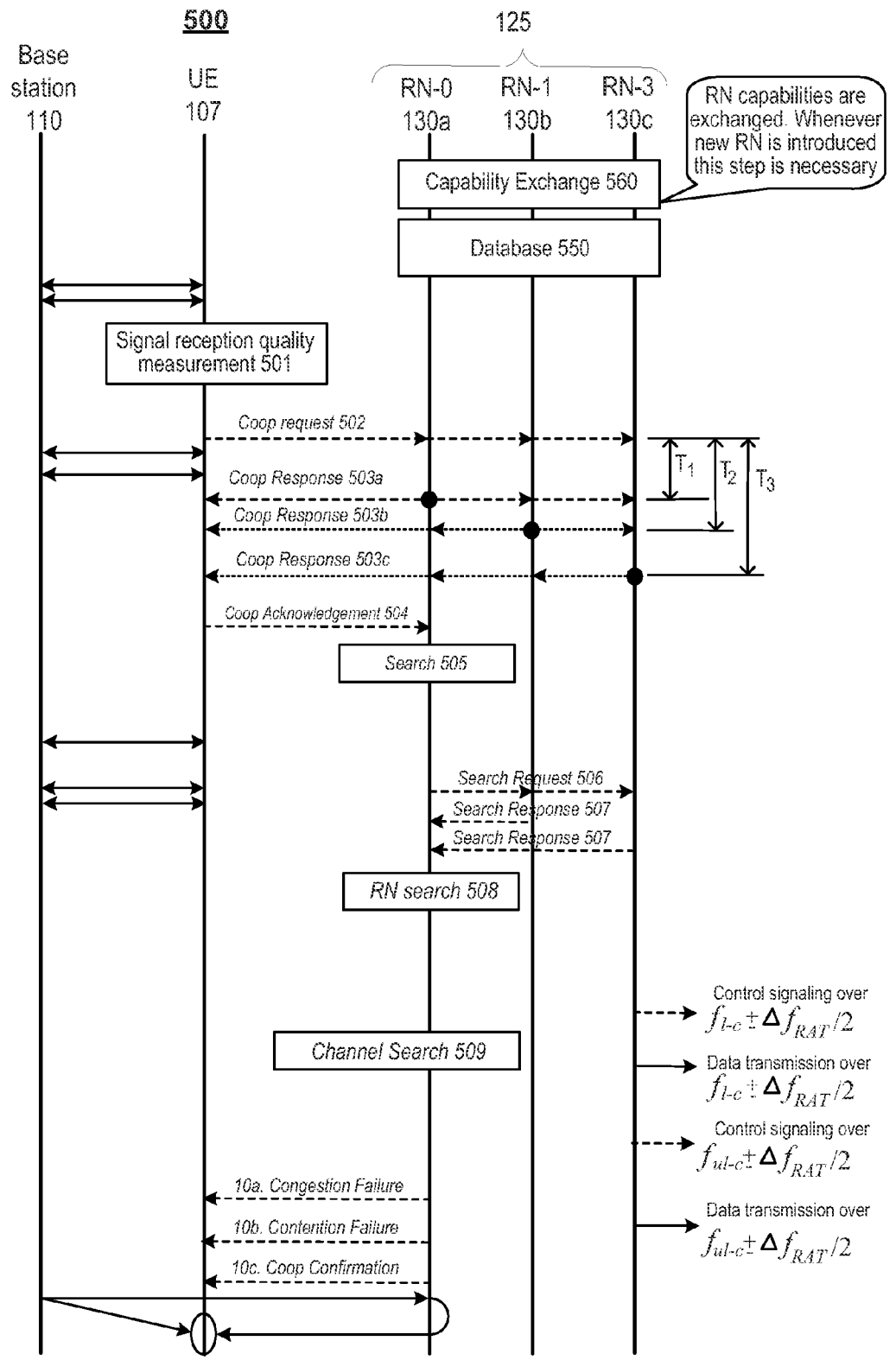
FIG. 5A is a schematic diagram illustrating examples of communication between nodes of a wireless network.

FIG. 5A shows a schematic diagram illustrating examples of communication between the UE and the LAN. The example shown using the schematic diagram 500 illustrates signaling between various nodes to set up a cooperative communication link between a UE 107 and a relay LAN 125. The relay LAN 125 in this example includes three relay nodes RN-0 (130*a*), RN-1 (130*b*) and RN-3 (130*c*). The example illustrates one possible sequence of activities in a wireless network system and should not be considered limiting. For example, the order of operations can be different from that described below without deviating from the scope of the present application.

In some implementations, the UE can perform a signal reception quality measurement 501 to determine if cooperation with the relay LAN 125 is needed. For example, during data/signaling exchange with the base station 110, the UE 107 can keep track of various parameters such as path loss, received SNR, packet loss rate, packet delay or any other metric that is representative of network performance or user experience. In some implementations, such measurements can also be performed during an initial entry into a network. The UE 107 can also detect the availability of the relay LAN 125 through broadcast messages, such as beacons, transmitted by one or more relay nodes 130 over a frequency band of spectrum dedicated for relay control signaling.

Based on the signal reception quality from the base station 110, the UE 107 can send a request for cooperation, for example the "coop request" 502, to the relay nodes 130*a*, 130*b* and 130*c*. The coop request 502 can be sent over the frequency band of spectrum dedicated for relay control signaling. In some implementations, bandwidth allocation to send the coop request 502 or other control messages can be advertised in the broadcast messages transmitted by the relay nodes 130. In some implementations, the coop request 502 can be sent using a contention based protocol such as carrier sense multiple access (CSMA). In some implementations, the UE's RAT credentials can be sent in the coop request message 502.

The relay nodes 130 that receive the coop request 502 can respond by sending a "coop response" 503. In some implementations, the relay nodes 130 can also monitor coop responses 503 transmitted over the relay LAN 125. For example, if a relay node 130*a* detects that another relay node 130*b* has already sent a coop response 503*b*, the relay node 130*a* may refrain from transmitting a coop response 503*a*. In some implementations, the UE 107 can receive coop-responses 503 from multiple relay nodes at or around a same time. In such cases, the UE 107 can be configured to select one of the relay nodes, for example either randomly or using a resolution protocol, or based on the received signal quality. For the UE 107 to select a relay node 130 from multiple coop responses 503, the UE 107 may need to separate the different responses from potentially colliding data packets. In some implementations, the colliding packets can be retransmitted from the corresponding relay nodes, for example after random back-off times.

In some implementations, a risk of collisions of coop responses 503 can be reduced by having the relay nodes transmit the coop responses such that they reach the UE 107 at different times. This can be done, in some implementations, by transmitting the coop response 503 on expiration of a time period after receiving the coop request 502, wherein the time period is determined based on a characteristic of the coop request. For example, the duration of the time period can be in an inverse relationship (e.g. they can be inversely proportional to one another) with the received signal strength/quality of the coop request message 502. In such a case, a relay node (e.g. 130a) that receives a coop request 502 with a high signal strength transmits the coop response 503a after time T1. A second relay node 130b that receives the coop request 502 with a relatively lower signal strength can transmit the coop response 503b after time T2 wherein T2>T1. Similarly, a third relay node 130c that receives the coop request 502 with the lowest signal strength, can transmit the coop response 503b after time T3 wherein T3>T2. If some situations, for example in an environment where transmission losses depend mainly on path length, the above scheme can reduce a probability of collision between coop responses 503 because the coop response 503a will reach the UE 107 before the coop response 503b with a high probability. In some implementations, the duration of the interval (between the reception of coop request and transmission of coop response) may also be dependent on the received signal strength from the wide area network eNB. In some implementations, the relay nodes can also monitor the control channels to detect whether the UE 107 transmits an acknowledgement after receiving the coop response 503. In such cases, some relay nodes can refrain from transmitting a coop response that was otherwise scheduled for transmission. For instance, in the above example, if the relay node 130b detects, within the time interval T2, that the UE 107 has transmitted an acknowledgement in response to the coop response 503a, the relay node 130b refrains from transmitting the coop response 503b even when the time interval T2 expires.

Figure 5B:
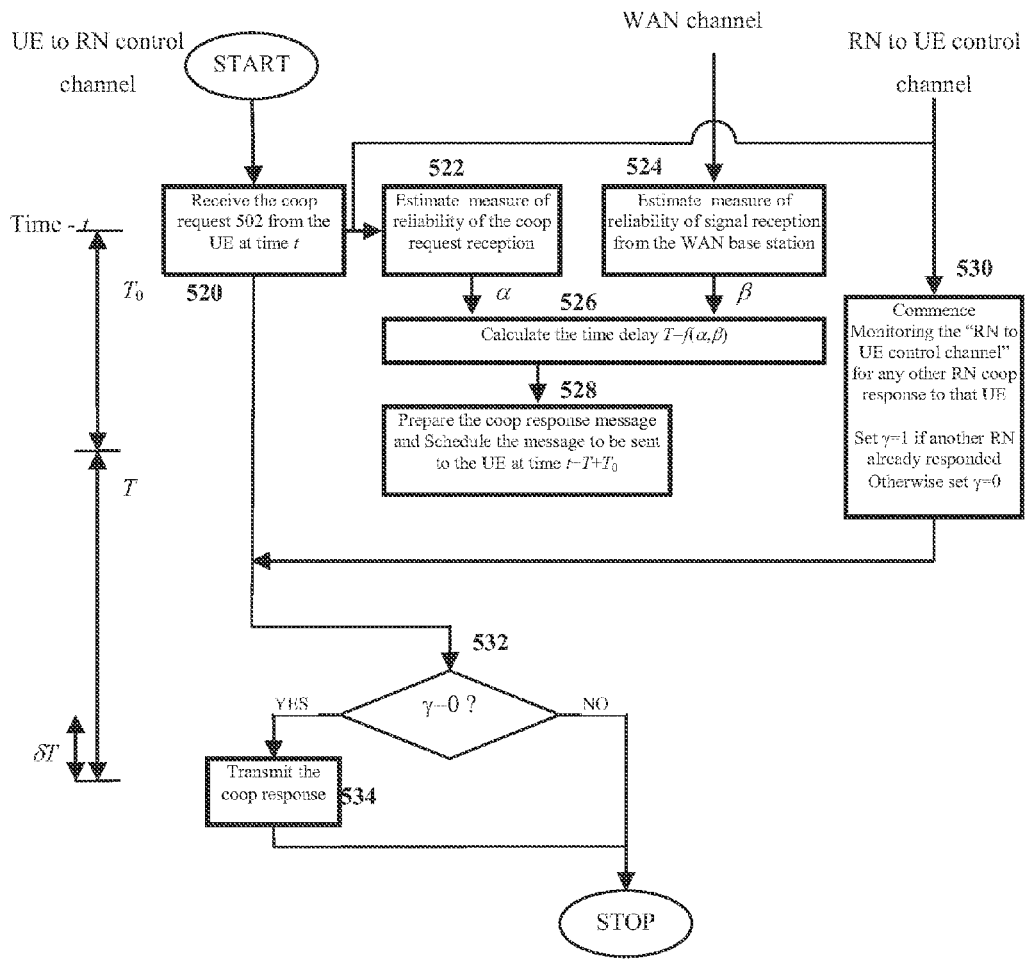
FIGS. 5B-5E are flow charts depicting example sequences of operations for at various nodes of a wireless network.

FIG. 5B shows an example sequence of operations performed at a relay node for sending a coop response 503 to the UE 107 in response to a coop request 502. In some implementations, a relay node may receive (520) a coop request 502 from a UE 107 which needs assistance from the relay network. The relay node can measure the received signal quality of the coop request 502. This can be done, for example, by estimating (522) a measure of reliability of the coop request. In some implementations, measuring the signal quality of the received coop request 502 can also include estimating (524) a measure of reliability of the signal received from a corresponding WAN base station. In some implementations, the received signal quality can be denoted as $\alpha$, and can be extracted as part of a signal demodulation procedure used for demodulating the coop request 502. The received signal quality from the corresponding WAN base station can be denoted by $\beta$. In some implementations, the parameter $\beta$ can be made available at the relay node as part of a periodic monitoring of WAN base stations within the vicinity of the relay node. In response to receiving the coop request 502, the relay node may start monitoring (530) the channel or resources dedicated for relay node to UE communications for any coop response 503 sent by other relay nodes within the same relay node network. If another relay node has already responded with a coop response 503, a flag is set accordingly. For example, a parameter $\gamma$, which is initialized as being equal to 0, can be set to 1 on detecting that another relay node has transmitted a coop response 503. In some implementations, the relay node may calculate (510) the time delay T between the reception of the coop request 502 and the transmission of the coop response 503 based on the signal quality parameters, $\alpha$ and $\beta$. The relay node can also prepare (528) the coop response 503 to be sent to the UE and schedule a transmission of the coop response 503 at time $t+T_0+T$. Here $T_0$ accounts for the pipeline delays in specific hardware implementation. The relay node can also check (532) whether a coop response has already been transmitted from another relay node within the relay node network. This can occur a short time, e.g. $\delta T$, before the actual scheduled transmission of the coop response 503 at time $t+T_0+T$. If a coop response 503 has not been transmitted from another relay node to the same UE, the coop response 503 is transmitted (534) from the relay node as scheduled. Alternatively, if a coop response 503 is determined to have been sent from another relay node, then the transmission of the scheduled coop response 503 is aborted and associated buffers are cleared.

In some implementations, after sending the coop request 502, the UE 107 can start a timer $T_{resp1}$ and monitor the control channel dedicated for responses from relay nodes. If the timer $T_{resp1}$ expires, the UE 107 can resend the coop request 502 on a control channel, for example randomly selected from the bandwidth allocated for communications between the UE 107 and the relay nodes 130.

If the coop-response 503 is received successfully, the UE can send a coop acknowledgement 504. The coop acknowledgement 504 can include various information such as RAT channel descriptors that can include one or more of i) a RAT type, ii) the operating channel, iii) a frequency band, iv) identity of the serving base station 110, v) a bandwidth requirement, vi) information on UL/DL channel configurations.

In some implementations, where the UE 107 receives the coop-responses 503 from different relay nodes 130 substantially close in time, the UE 107 can randomly select one of the relay nodes to send the coop acknowledgement 504. For example, the relay nodes RN-n and RN-m can send the message to the UE 107 when the following condition occurs:

$$|T_n - T_m| < \tau$$

Where $T_n$ and $T_m$ indicate the time of the coop-responses 503 transmitted by RN-n and RN-m and $\tau$ is time ambiguity between the channel sensing and the sending the coop-response 503. In some implementations, if the UE 107 can't detect collision of the packets, the relay nodes can resend the message with random back-off times.

Figure 5C:
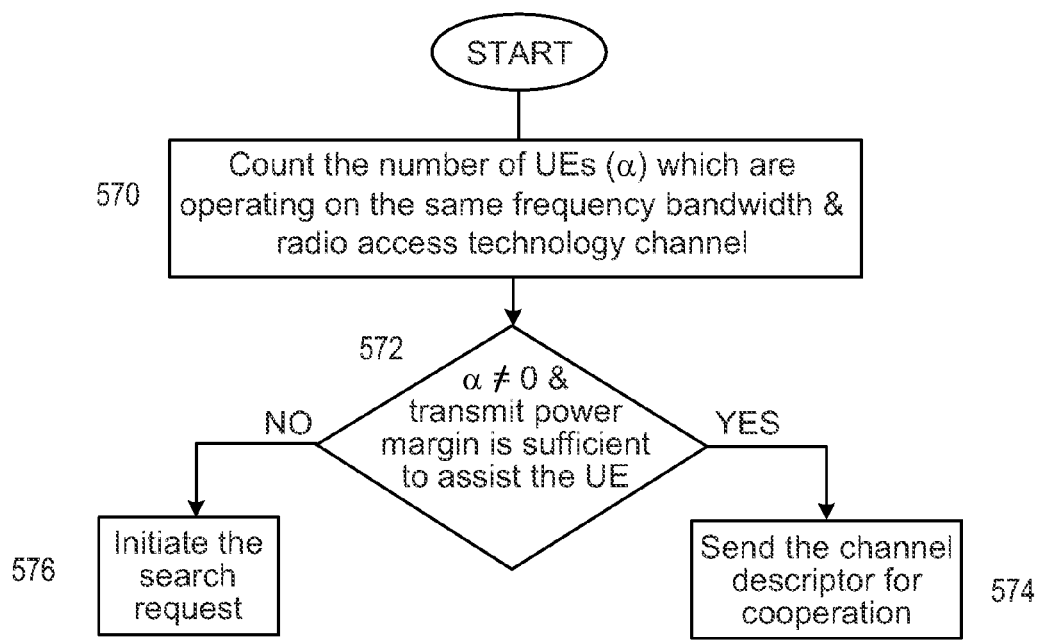

In some implementations, the relay node (130a, in this example) which receives the coop acknowledgement 504 from the UE 107, can perform a search 505 to find if there is an ongoing cooperative transmission with another UE with the same RAT descriptor. An example sequence of operations for the search 505 is shown in FIG. 5C. Operations can include counting a number of UEs operating on the same RAT (and frequency band) that the relay node 130a is cooperating with (570). If the relay node 130a finds another UE operating on the same frequency band and RAT channel, and also if the required transmit power is within the capabilities of the relay node 130a (572), a coop-confirmation with description of relay LAN transmission credentials is sent to the UE 107 (574). In some implementations, the relay LAN credentials can include a channel descriptor corresponding to a channel or frequency band to be used in the cooperation.

In some implementations, if the relay node 130a does not find another UE operating on the same frequency band, a search request 506 is transmitted (576) by the relay node 130a for the other relay nodes to find whether those relay nodes are assisting other UE(s) which are operating on the same RAT channel. The search request 506 can include the RAT channel descriptor of the UE 107.

In some implementations, all the relay nodes in the relay LAN 125 can have access to a database 550 of UEs that are cooperating with at least one relay node of the relay LAN 125. In some implementations, the database 550 can be maintained at each relay node separately. In some implementations, the relay nodes can exchange their current database with all the other relay nodes, for example, either periodically or by events such as the initiation of a new cooperative relationship with a UE. The database 550 can be updated when a UE joins or leaves a cooperative relationship with a relay node. In some implementations, the relay nodes of the relay LAN 125 can perform a capability exchange 560 to exchange resource information between the relay nodes. Such a capability exchange 560 can be done, for example, periodically or when a new relay node is introduced in the network. In some cases, the search request 506 is sent to confirm the cooperation status of the various relay nodes before sending a confirmation to the UE.

The relay nodes 130 which successfully receive the search request message can search their database 550 to find the existence of current cooperation status with a UE which has substantially the same credentials. In some implementations, the search 505 is performed at all the relay nodes that receive the search request 506. The other relay nodes can then transmit a search response 507. In one example, a particular relay node can transmit an "acknowledgement (ACK)" signal if a UE with substantially the same credentials as the UE 107 is found to be cooperating with the particular relay node. If no such UE is found, the relay node can transmit a "non-acknowledgement (NACK)" signal as the search response 507.

Figure 5D:
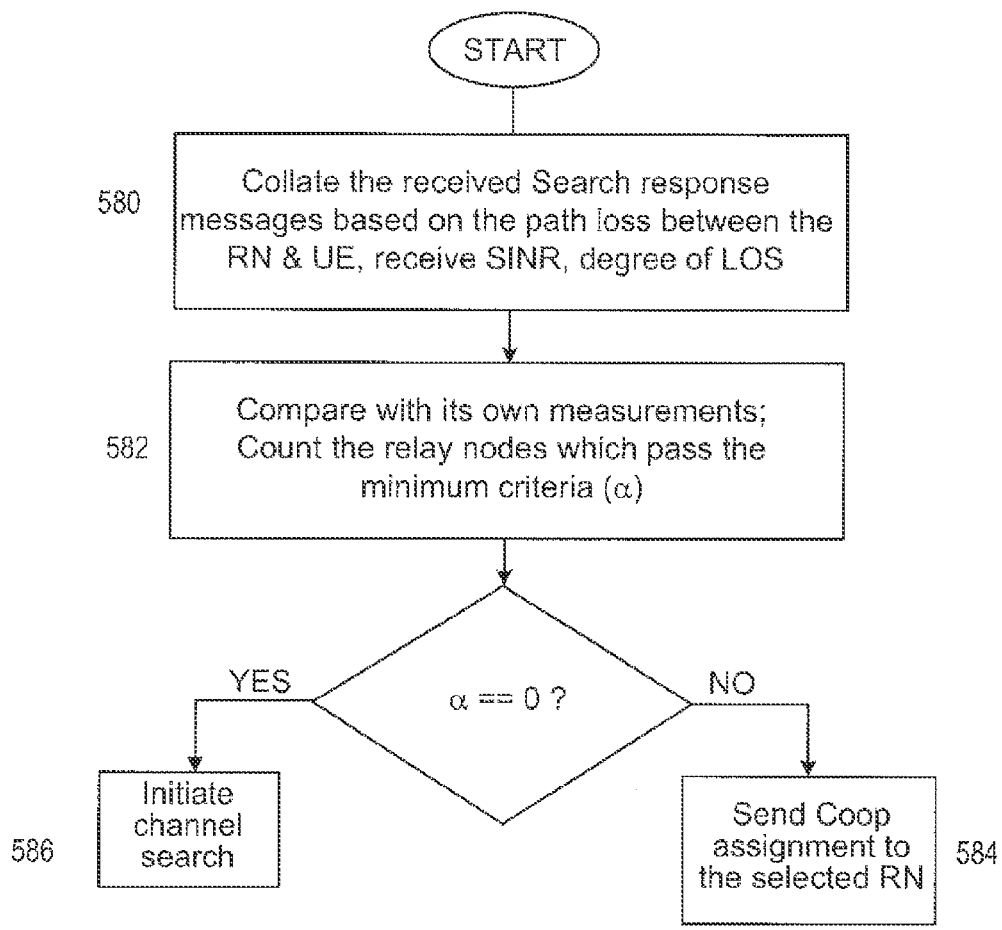

In some implementations, the relay node 130a can determine a most appropriate relay node in the relay LAN 125 for cooperating with the UE 107. An example sequence of operations for such a determination is shown in FIG. 5D. Operations can include the relay node 130a collecting all the search responses 507 from the other relay nodes (580). The search responses can also include information of various parameters such as a path loss between the radio node and the UE, the reception signal to interference and noise ratio (SINR) at the relay node and a degree of line of sight (LOS). In some implementations, a relay node search 508 can be performed at the relay node 130 to determine the most appropriate relay node (or combination of relay nodes) for cooperating with the UE 107. Such determination can be done based on the information or parameters in the search responses 507. The information or parameters from the search responses 507 can be compared (582) to predetermined thresholds to determine if a corresponding relay node can be considered as a candidate for cooperating with the UE 107. In some implementations, the information from the search responses can also be compared with measurements at the relay node 130a. If a suitable relay node to cooperate with the UE 107 is selected, the relay node 130a can send (584) assignment information to the selected relay node. The assignment information can include instructions for the relay node to initiate communication with the UE 107.

Figure 5E:
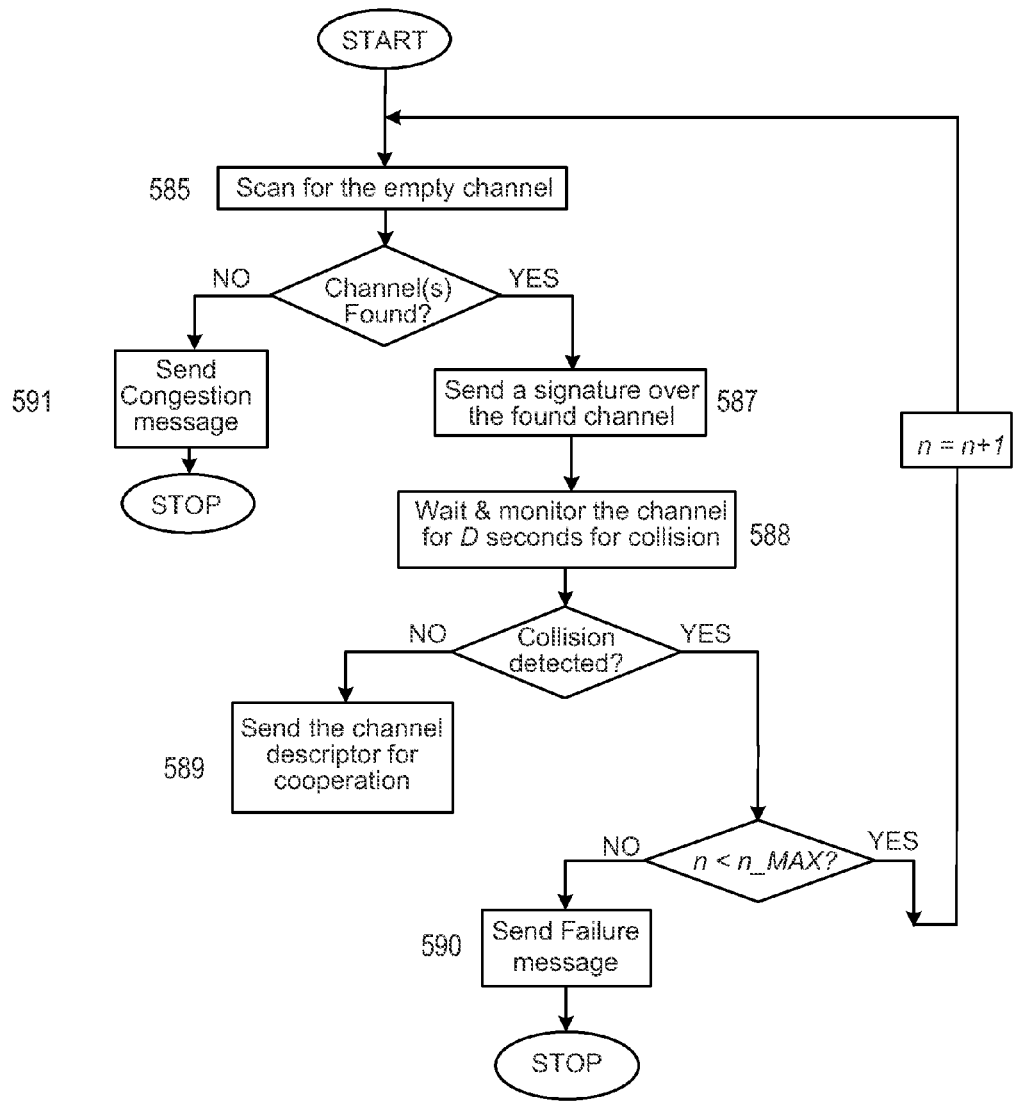

In some implementations, if the credentials of the UE requesting cooperation do not match with any other UE that is cooperating with any other relay node in the network, the relay node 130a can initiate (586) a channel search 509 to find a vacant channel for cooperation. An example sequence of operations for the channel search 509 is shown in FIG. 5E. Operations can include the relay node 130a scanning (585) the available spectrum for at least one empty channel. For example, if the RAT channel bandwidth is $\Delta f_{RAT}$, the relay node 130a can search for, for example, an empty channel of $\Delta f_{RAT}$ if the RAT is operating in TDD mode or for channel of bandwidth $2\Delta f_{RAT}$ if the RAT is operating in a FDD mode. If the relay node does not find any empty channel, a congestion message is sent (591) to the UE 107. Alternatively, the relay node may (based on the configuration of the LAN) retransmit the signal after amplification without frequency shifting. Yet another alternative is to amplify a delayed version of the signal and retransmit on the same channel as the WAN. The delay introduced in the signal transmission should be selected such that the performance gains are achieved at the receiver through channel time diversity. If an empty channel is found, the relay node 130a transmits (587) a signature sequence continuously over the channel. After a predetermined amount of time, for example, D seconds, the relay node 130a monitors (588) the channel to check for any collisions. If a collision is detected, the relay node scans the available spectrum again to find another empty channel. After a predetermined number of tries, n_MAX, if an empty channel is not found, relay node can send (590) failure message to the UE 107. If an empty channel is found then the channel descriptor is sent (589) to the UE 107 for cooperation.

Once a cooperative communication is established between the relay node 130a and the UE 107, the relay node 130a relay the signals from the wide area network node. The relay transmit power level settings can be determined based on whether it is DL or UL.

The relay nodes 130 and the relay LAN can be configured in various ways to communicate with the UEs 107. Examples of configuration operations can include relay node initialization, control channel configuration, beacon initialization and amplifier setting configuration.

Figure 6:
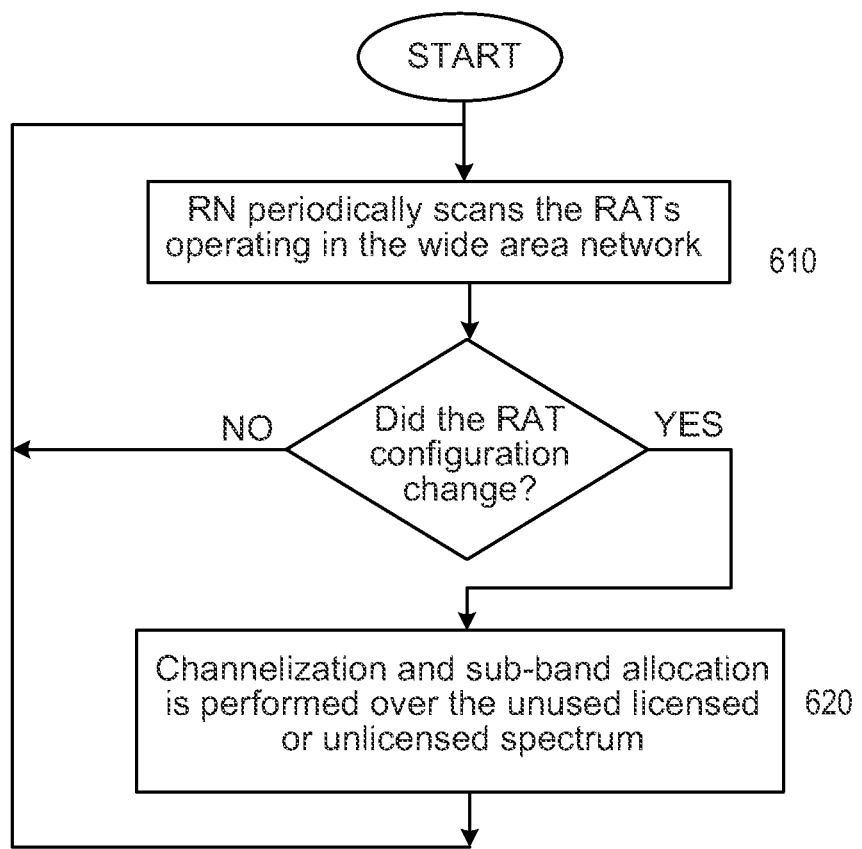
FIG. 6 is a flow chart showing an example sequence of operations for a relay node initialization.

FIG. 6 is a flow chart showing an example sequence of operations for a relay node initialization. Operations can include the relay node 130 periodically scanning (610) the RATs operating in the WANs. In some implementations, during the periodic scanning, the relay node reads the broadcast channel (BCH) to find the RAT specific parameters of the WANs that are providing coverage in the area. Based on the RAT specific BCH descriptor, the available local area relay spectrum can be fragmented into chunks which can be, for example, substantially equal to the smallest radio resource assignment found from the BCH. For example, if LTE networks around the relay LAN 125 are operating over $f_{l_{c1}}$ and $f_{l_{c2}}$ and the corresponding bandwidths are $\Delta f_{lc1}=2.5$ MHz and $\Delta f_{lc2}=10$ MHz, respectively, then the available local area relay spectrum can be divided into segments of 2.5 MHz.

In general, if the RATs are operating over the channel bandwidths of $\Delta f_{lc0}, \Delta f_{lc1}, \ldots, \Delta f_{lcn}$, the local area relay spectrum can be subdivided into channels of bandwidth equal to $\Delta f=GCD(\Delta f_{lc0}, \Delta f_{lc1}, \ldots, \Delta f_{lcn})$ where GCD ( . . . ) indicates the greatest common divisor.

In some implementations, if a RAT configuration change is detected, operations can also include performing (620) channelization and sub-band allocation. Such allocation can be performed, for example, over an unused portion of the licensed frequency bands or over unlicensed frequency bands. In some implementations, if the RAT configuration changes while the relay node 130 is actively serving a UE 107, the channelization and sub-band allocation changes are typically deferred until the relay service is completed for such UE. In other implementations, the UEs which are obtaining assistance from RNs may be informed about the new channel allocation. In such case, the channels for cooperative communication will be updated and the UEs so informed.

Figure 7:
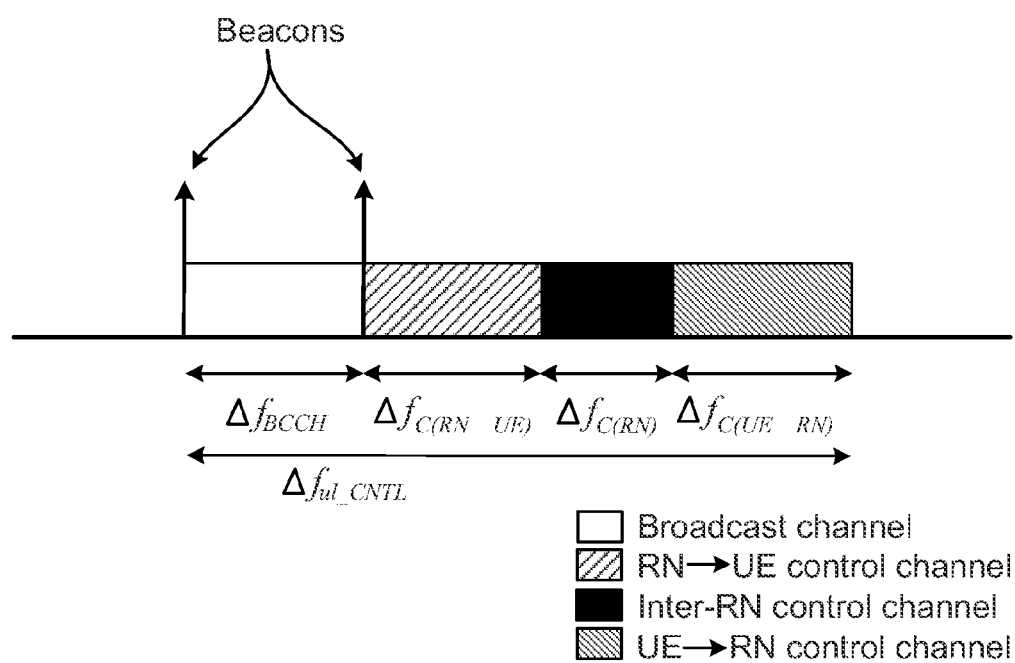
FIG. 7 shows an example of a control channel configuration.

FIG. 7 depicts an example of a control channel configuration. Within the available local area spectrum (under-utilized licensed or unlicensed band), some bandwidth can be assigned for control signaling. This bandwidth can be represented as $\Delta f_{ul\_CNTL}$. In an FDD approach, the bandwidth $\Delta f_{ul\_CNTL}$ can be divided into four channels; a broadcast channel with bandwidth $\Delta f_{BCCH}$, an RN→UE control channel with bandwidth $\Delta f_{C(RN \rightarrow UE)}$, a RN control channel with bandwidth $\Delta f_{C(RN)}$ and an UE→RN control channel with bandwidth $\Delta f_{C(UE \rightarrow RN)}$. To facilitate control signalling, for example, two beacon/pilot tones can be transmitted at the edges of the broadcast channel. An UE requiring assistance can scan the local area spectrum and sense these beacons/pilots. The UE can thus read the broadcast channel, which in turn can describe the other control channels.

In the above example, the control channel is configured in the frequency domain. In some implementations, the channels can also be configured for TDMA or CDMA in time and code domains, respectively or combination of time, frequency and code domains.

Even though FIG. 7 shows the different control channels to be substantially adjacent to one another, in other implementations, the control channels can also be non-adjacent. In this example, the beacons are configured to be on either side of the broadcast channel, for example, to make the bandwidth of the broadcast channel flexible. Typically, the UE 107 can detect the beacons and can read the broadcast channel. The broadcast channel can also be used to point to the other control channels. The UE can obtain the configuration of the control channels by reading the broadcast channel.

In some implementations, the relay nodes 130 can relay the broadcast messages or beacon signals substantially continuously. However, in some cases the beacon signals can be kept turned off and initialized only upon detection of a UE 107 in the vicinity.

Figure 8:
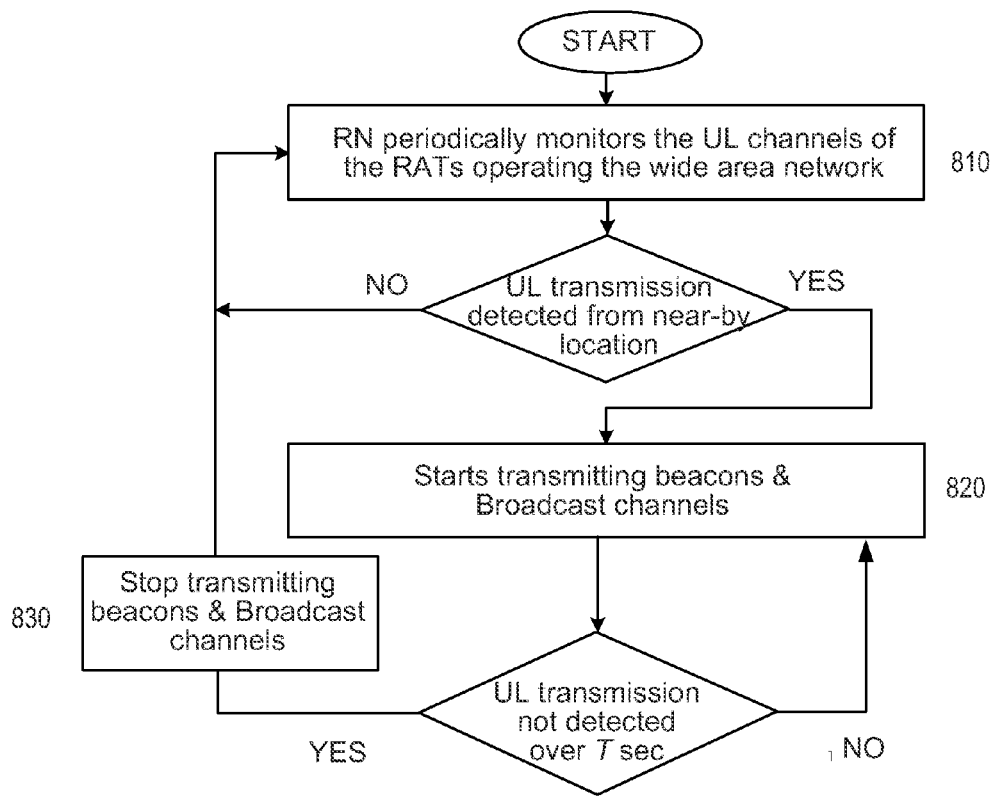
FIG. 8 is a flow chart of example sequence of operations for a beacon signal initialization.

In such case, the relay nodes can refrain from relaying the downlink broadcast channels of the WANs over selected local area spectrum until an uplink channel utilization (by a UE) is detected. An example sequence of operations for such beacon initialization is shown in FIG. 8. Operations can include a relay node 130 periodically monitoring (810) the UL channels of all the RATs operating on the wide area network. In some implementations, the random access channels of the RATs can be continuously monitored. In the absence of any UE activity, the power consumption at the relay node 130 can be reduced because the DL broadcast channels are not relayed. The relay nodes 130 however, can continue to send their control channel beacons to ensure that a UE that may be shadowed in the local area from the wide area base station signals, is able to detect the availability of the relay node service. Operations can also include starting (820) beacon and broadcast transmissions upon detecting an UL from the UE. In some implementations, at least one of the beacon or broadcast signals can be turned off (830) if UL transmission from the UE is not detected for a predetermined time period T.

The amplifier settings at both the DL and UL transceivers at the relay node 130 can be configured for achieving performance enhancements. For example, the performance of diversity combining on the downlink can be maximized when the following criterion is satisfied:

$$A = \min\left(A_{max}, \frac{\sqrt{L_{BM}}}{\sqrt{L_{RM} L_{BR}}}\right) \quad (12)$$

where $A_{max}$ is the maximum possible power amplification factor and $L_{BM}$, $L_{RM}$ and $L_{BR}$ are path losses between the base station and the UE, the relay node and the UE, and the base station and the relay node, respectively. In some implementations, based on knowledge of path loss from the base station to the UE, a relay node can appropriately set the amplification factor. In some cases where multiple UEs are operating on the same bandwidth, an average amplification factor can also be used. Similarly the performance in UL can be maximized when the relay node amplifies the received signal by the following factor:

$$A = \min\left(A_{max}, \frac{1}{\sqrt{L_{RM}}}\right) \quad (13)$$

In some implementations, the UL signal transmitted by the UL transceiver of the relay node can be received at the base station 110 along with a second UL signal directly from the UE 107. In such cases, the UL signals can be combined at the base station. This is illustrated using the following example analysis.

In this example, the UE 107 can send data packets to the base station 110 using a signal $S_M(k)$ at time k, over a RAT channel used by the corresponding WAN 105. As described above, the relay node can receive the UL transmission from the UE 107 over the relay LAN 125 and frequency shift the received signal to the RAT channel used by the WAN. The relay node then transmits the frequency shifted signal to the WAN base station 110 possibly after appropriate amplification. In some implementations, the signal received at the WAN base station 110 from the UE can be expressed as:

$$R_{BM}(k;f_{1\_c}) = A\sqrt{L_{BM}}C_{BM}(k) + N_B(k) \quad (14)$$

where $L_{BM}$ is the path loss between the base station and the UE 107, $C_{BM}(k)$ is the fast fading component, and $N_B(k)$ represents the thermal noise and other interference received at the base station 110.

The signal received at the base station from the relay can be expressed as:

$$R_{BR}(k;f_{ul\_c}) = A\sqrt{L_{BR}}C_{BR}(k)\{\sqrt{L_{RM}}C_{RM}(k)S_M(k)N_R(k)\} + N_B(k) \quad (15)$$

The above equation can further be written as:

$$R_{BB}(k;f_{ul\_c}) = A\sqrt{L_{BR}}\sqrt{L_{RM}}C_{BR}(k)C_{RM}(k)S_M(k) + \{A\sqrt{L_{BR}}C_{BR}(k)N_R(k) + N_B(k)\} \quad (16)$$

The combined signal at the base station receiver is given by:

$$R_B(k) = \{A\sqrt{L_{BR}}\sqrt{L_{RM}}C_{BR}(k)C_{RM}(k) + \sqrt{L_{BM}}C_{BM}(k)\}S_M(k) + \{A\sqrt{L_{BR}}C_{BR}(k)N_R(k) + N_B(k)\} \quad (17)$$

In some implementations, where $A\sqrt{L_{RM}} \approx 1$, $L_{BR} \approx L_{BM}$ and $C_{RM}(k) \approx 1$, the above equation can be simplified as:

$$R_B(k) = \sqrt{L_{BM}}\{C_{BR}(k) + C_{BM}(k)\}S_M(k) + \{A\sqrt{L_{BR}}C_{BR}(k)N_R(k) + N_B(k)\} \quad (18)$$

In some implementations, where $L_{BR}$ is sufficiently large, $R_B(k)$ can be approximated as:

$$R_B(k) = \sqrt{L_{BM}}\tilde{C}_{BM}(k)S_M(k) + N_B(k) \quad (19)$$

Where $\tilde{C}_{BM}(k)$ represents the composite channel that can be expressed as:

$$\tilde{C}_{BM}(k) = C_{BR}(k) + C_{BM}(k)$$

In situations when the propagation delay introduced by the relay node 130 is significantly large and is within the cyclic prefix of the OFDM symbol (in the case of OFDMA or SC-OFDMA systems), the frequency selectivity of the channel is increased. Therefore the diversity gains obtained at the base station are proportional to the delay between the relayed signal path and the direct path. In some implementations, the delay can be introduced at the relay node to obtain an improved diversity gain at the base station 110.

Figure 9:
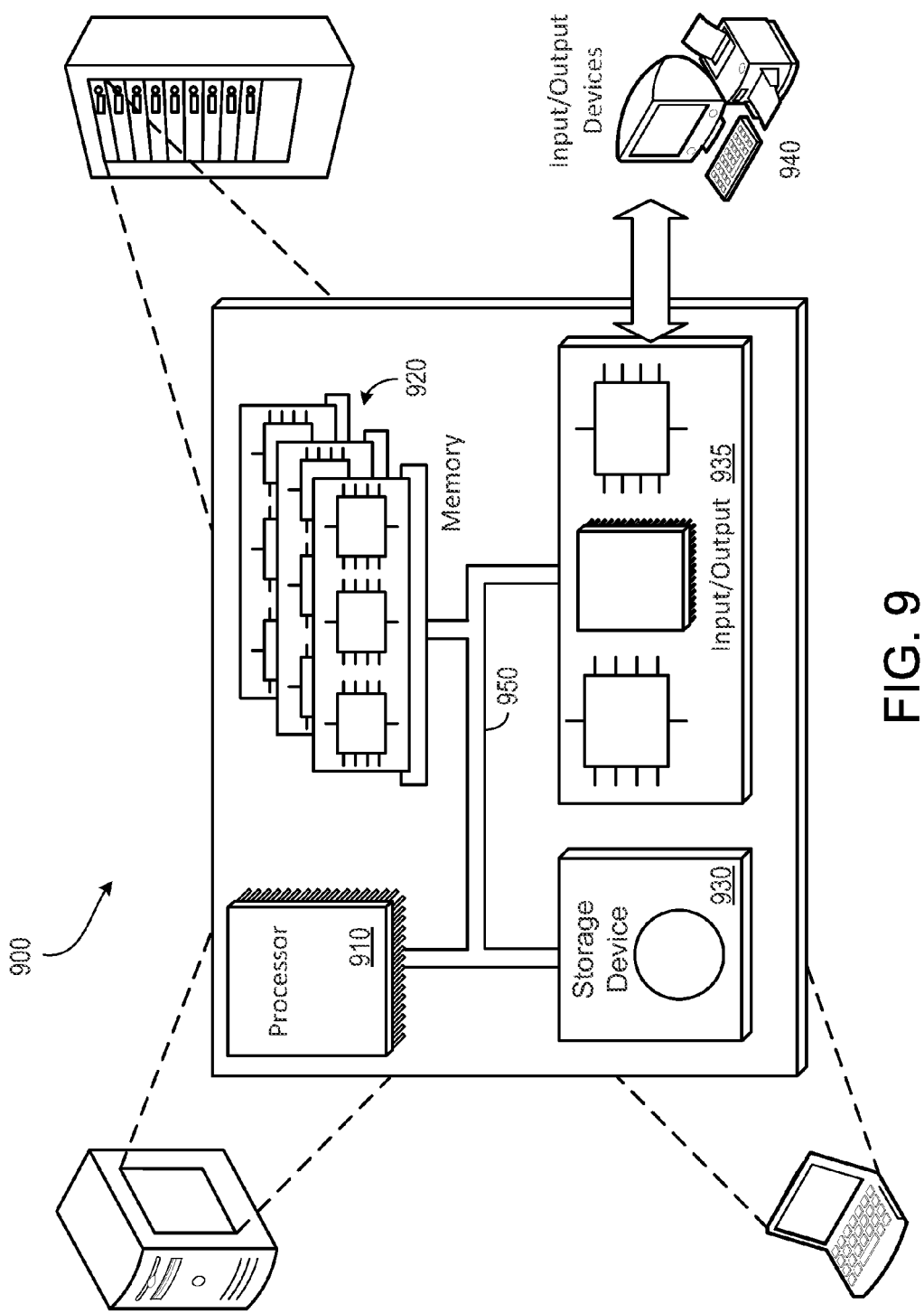
FIG. 9 is a schematic diagram of an example of a computing device.

FIG. 9 is a schematic diagram of a computer system 900. The system 900 can be used for the operations described in association with any of the computer-implemented methods described herein, according to one implementation. The system 900 includes a processor 910, a memory 920, a storage device 930, and an input/output devices 940. Each of the components 910, 920, 930, and 940 are interconnected using a system bus 950 (the Input/Output Devices 940 are connected to the system bus 950 via the Input/Output interfaces 935). The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output devices 940.

The memory 920 stores information within the system 900. In some implementations, the memory 920 is a computer-readable medium. The memory 920 can include volatile memory and/or non-volatile memory.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output devices 940 provide input/output capabilities for the system 900. In some implementations, the input/output devices 940 include a keyboard and/or pointing device. In some implementations, the input/output devices 940 include a display unit for displaying graphical user interfaces.

The features described herein can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 910 carries out instructions related to a computer program. The processor 910 may include hardware such as logic gates, adders, multipliers and counters. The processor 910 may further include a separate arithmetic logic unit (ALU) that performs arithmetic and logical operations.

What is claimed is:

1. A mobile device comprising:
  one or more processors configured to:
    transmit a request for cooperation by a relay device to communicate with an external wireless network;
    establish a communication link with the relay device based, at least in part, on a response from the relay device, the response identifying network resources available for communication with the relay device including a first local frequency band available for communicating with the relay device;
    transmit, to the relay device, in connection with establishing the communication link, an acknowledgement signal including information specifying a radio access technology used by the mobile device to directly communicate with the external wireless network; and
    while the communication link with the relay device is established, directly communicate with the external wireless network using a frequency band different from the first local frequency band used for communicating with the relay device.

2. The mobile device of claim 1, the one or more processors further configured to transmit the request in response to detecting a control signal from the relay device.

3. The mobile device of claim 1, the one or more processors further configured to receive a first wireless signal from the relay device, the first wireless signal based, at least in part, on frequency shifting a second wireless signal transmitted by a base station of the external wireless network, to the first local frequency band.

4. The mobile device of claim 3, the one or more processors further configured to receive the second wireless signal and combine the first and second wireless signals.

5. The device of claim 3, wherein the first and second signals are combined coherently.

6. The mobile device of claim 1, the one or more processors are further configured to request the cooperation from the relay device based on detecting that a reception quality at the mobile device is below a threshold condition.

7. The mobile device of claim 1, the one or more processors are further configured to transmit the request for cooperation by the relay device on a control channel selected based on information included in the response from the relay device.

8. The mobile device of claim 1 further comprising a transmitter that transmits a wireless signal over a second local frequency band identified as a part of the network resources available for communication with the relay device.

9. The mobile device of claim 8, wherein the transmitter is configured to frequency shift the wireless signal to the second local frequency band from another frequency band that is at least partially non-overlapping with the second local frequency band.

10. The mobile device of claim 1 the one or more processors further configured to control a transmission power of the wireless signal in accordance with the network resources available for communication with the relay device.

11. A method comprising:
transmitting, by a mobile device, a request for cooperation by a relay device to communicate with an external wireless network;
establishing a communication link with the relay device based, at least in part, on a response from the relay device, the response identifying network resources available for communication with the relay device including a first local frequency band available for communicating with the relay device;
transmitting, to the relay device, in connection with establishing the communication link, an acknowledgement signal including information specifying a radio access technology used by the mobile device to directly communicate with the external wireless network; and
while the communication link with the relay device is established, directly communicating with the external wireless network using a frequency band different from the first local frequency band used for communicating with the relay device.

12. The method of claim 11, further comprising transmitting the request in response to detecting a control signal from the relay device.

13. The method of claim 11, further comprising receiving a first wireless signal from the relay device, the first wireless signal based, at least in part, on frequency shifting a second wireless signal transmitted by a base station of the external wireless network, to the first local frequency band.

14. The method of claim 13 further comprising receiving the second wireless signal and combining the first and second wireless signals.

15. The method of claim 13, wherein the first and second signals are combined coherently.

16. The method of claim 11 further comprising requesting the cooperation from the relay device based on detecting that a reception quality at the mobile device is below a threshold condition.

17. The method of claim 11, further comprising transmitting the request for cooperation by the relay device on a control channel selected based on information included in the response from the relay device.

18. The method of claim 11 further comprising transmitting a wireless signal over a second local frequency band identified as a part of the network resources available for communication with the relay device.

19. The method of claim 18 further comprising frequency shifting the wireless signal to the second local frequency band from another frequency band that is at least partially non-overlapping with the second local frequency band.

20. The method of claim 18 further comprising controlling a transmission power of the wireless signal in accordance with the network resources available for communication with the relay device.

21. A computer non-transitory readable storage device having encoded thereon computer readable instructions, which when executed by a processor, cause a processor to perform operations comprising:
transmitting, by a mobile device, a request for cooperation by a relay device to communicate with an external wireless network;
establishing a communication link with the relay device based, at least in part, on a response from the relay device, the response identifying network resources available for communication with the relay device including a first local frequency band available for communicating with the relay device;
transmitting, to the relay device, in connection with establishing the communication link, an acknowledgement signal including information specifying a radio access technology used by the mobile device to directly communicate with the external wireless network; and
while the communication link with the relay device is established, directly communicating with the external wireless network using a frequency band different from the first local frequency band used for communicating with the relay device.

* * * * *

UNITED STATES PATENT AND TRADEMARK OFFICE
CERTIFICATE OF CORRECTION

| | |
|---|---|
| PATENT NO. | : 9,253,647 B2 |
| APPLICATION NO. | : 13/559436 |
| DATED | : February 2, 2016 |
| INVENTOR(S) | : Chandra Sekhar Bontu and David Steer |

It is certified that error appears in the above-identified patent and that said Letters Patent is hereby corrected as shown below:

Claims

Column 25, Line 4, In Claim 5, after "The" insert -- mobile --.

Column 26, Line 29, In Claim 21, delete "computer nontransitory" and insert -- non-transitory computer --, therefor.

Signed and Sealed this
Twenty-fourth Day of May, 2016

Michelle K. Lee
*Director of the United States Patent and Trademark Office*